United States Patent
Kikuchi et al.

(10) Patent No.: US 8,821,046 B2
(45) Date of Patent: Sep. 2, 2014

(54) ACCESSORY, IMAGING APPARATUS, AND DETECTION METHOD

(75) Inventors: Kazuto Kikuchi, Kanagawa (JP); Shouta Katou, Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/608,353

(22) Filed: Sep. 10, 2012

(65) Prior Publication Data

US 2013/0077953 A1 Mar. 28, 2013

(30) Foreign Application Priority Data

Sep. 22, 2011 (JP) .................................. 2011-207913

(51) Int. Cl.
| | |
|---|---|
| G03B 17/00 | (2006.01) |
| G02B 7/14 | (2006.01) |
| G02B 7/04 | (2006.01) |
| G03B 17/14 | (2006.01) |
| G02B 7/10 | (2006.01) |

(52) U.S. Cl.
CPC .. *G02B 7/04* (2013.01); *G02B 7/14* (2013.01); *G03B 17/14* (2013.01); *G02B 7/102* (2013.01)
USPC ........................................................ 396/530

(58) Field of Classification Search
USPC .............................................. 396/529–530
See application file for complete search history.

(56) References Cited

U.S. PATENT DOCUMENTS

| | | | | |
|---|---|---|---|---|
| 4,965,601 | A | * | 10/1990 | Canty ............................. 396/19 |
| 6,738,571 | B2 | * | 5/2004 | Takeda ............................. 396/55 |
| 2001/0038757 | A1 | * | 11/2001 | Taku ............................ 396/538 |
| 2006/0088314 | A1 | * | 4/2006 | Matsushita et al. ........... 396/529 |
| 2007/0265498 | A1 | * | 11/2007 | Ito ................................ 600/134 |
| 2010/0053768 | A1 | * | 3/2010 | Yumiki et al. ................ 359/698 |

FOREIGN PATENT DOCUMENTS

JP 06-051386 A 2/1994

\* cited by examiner

*Primary Examiner* — Clayton E Laballe
*Assistant Examiner* — Dennis Hancock
(74) *Attorney, Agent, or Firm* — Sony Corporation

(57) ABSTRACT

There is provided an accessory that is attachable to or detachable from an apparatus body having a plurality of contact terminals, the accessory including a plurality of connection terminals that are connected to the plurality of contact terminals, respectively, and exchange a signal with the apparatus body, when the plurality of connection terminals are attached to the apparatus body, a lock lever that is operated between a lock position and a non-lock position and performs locking with respect to the apparatus body, when the lock lever is operated to the lock position, and a detection activation section that starts a detection operation of a connection state of the plurality of contact terminals and the plurality of connection terminals, when the lock lever is operated to the lock position.

20 Claims, 18 Drawing Sheets

25···FIXING RING (FIXING SECTION)
25b···FITTING RECESS
27a···DETECTION SWITCH
30···LOCK LEVER
33···SPRING CASE
37···OPERATION SECTION
37a···EXTERNAL SURFACE
38···BIASING SPRING
39···CLICK BALL
42···DETECTION ACTIVATION SECTION

1 ··· IMAGING APPARATUS
2 ··· APPARATUS BODY
3 ··· ACCESSORY
30 ··· LOCK LEVER

25 ··· FIXING RING (FIXING SECTION)
25b ··· FITTING RECESS
27a ··· DETECTION SWITCH
30 ··· LOCK LEVER
37 ··· OPERATION SECTION
42 ··· DETECTION ACTIVATION SECTION

25···FIXING RING (FIXING SECTION)
27a···DETECTION SWITCH
30···LOCK LEVER

25···FIXING RING (FIXING SECTION)
25b···FITTING RECESS
27a···DETECTION SWITCH
33···SPRING CASE
37···OPERATION SECTION
37a···EXTERNAL SURFACE
38···BIASING SPRING
39···CLICK BALL

25 ··· FIXING RING (FIXING SECTION)
25b ··· FITTING RECESS
27a ··· DETECTION SWITCH
30 ··· LOCK LEVER
33 ··· SPRING CASE
37 ··· OPERATION SECTION
42 ··· DETECTION ACTIVATION SECTION

25··· FIXING RING (FIXING SECTION)
25b··· FITTING RECESS
27a··· DETECTION SWITCH
33··· SPRING CASE
37··· OPERATION SECTION
37a··· EXTERNAL SURFACE
38··· BIASING SPRING
39··· CLICK BALL

25··· FIXING RING (FIXING SECTION)
27a··· DETECTION SWITCH
30··· LOCK LEVER
33··· SPRING CASE
37··· OPERATION SECTION
42··· DETECTION ACTIVATION SECTION

25··· FIXING RING (FIXING SECTION)
27b··· DETECTION SWITCH
30··· LOCK LEVER
33A··· SPRING CASE
37A··· OPERATION SECTION
42A··· DETECTION ACTIVATION SECTION

25··· FIXING RING (FIXING SECTION)
27b··· DETECTION SWITCH
30··· LOCK LEVER
33A··· SPRING CASE
37A··· OPERATION SECTION
42A··· DETECTION ACTIVATION SECTION

ACCESSORY, IMAGING APPARATUS, AND DETECTION METHOD

CROSS-REFERENCE TO RELATED APPLICATION

The present application claims priority from Japanese Patent Application No. JP 2011-207913 filed in the Japanese Patent Office on Sep. 22, 2011, the entire content of which is incorporated herein by reference.

BACKGROUND

The present disclosure relates to an accessory, an imaging apparatus, and a detection method. More particularly, the present disclosure relates to technology for enabling a detection operation of a connection state of a plurality of contact terminals and a plurality of connection terminals when a lock lever is operated and locking is made to start and securing an accurate detection operation for the connection state of the contact terminals and the connection terminals.

In imaging apparatuses such as digital still cameras, an interchangeable lens may be attached to or detached from a front surface of an apparatus body and functionality thereof is improved by attaching the interchangeable lens. The interchangeable lens may be attached to the apparatus body using an adapter and the interchangeable lens or the adapter is used as an accessory in the imaging apparatus.

As a method of attaching the accessory to the apparatus body in the imaging apparatus which the accessory is attachable to or detachable from, a so-called bayonet method of rotating the entire accessory about the apparatus body and engaging engagement sections of the accessory with engagement sections of the apparatus body and a so-called spigot method of operating a lock lever provided in the accessory or the apparatus body and engaging the engagement sections of the accessory with the engagement sections of the apparatus body have been known (for example, refer to Japanese Patent Application Publication No. 06-51386).

In the bayonet method, the accessory is attached to the apparatus body by rotating the entire accessory at a constant angle, in a state in which the accessory is pushed to the front surface of the apparatus body from the front side.

In the bayonet method, because there is no lock lever, a structure of the accessory is simple. However, because the entire accessory is rotated about the apparatus body, each structural element of the apparatus body should be provided at a position evacuated from the rotation trace of the accessory by considering avoidance of interference with the accessory and a degree of freedom of designing of the imaging apparatus is low.

Meanwhile, in the spigot method, the accessory is attached to the apparatus body by operating the lock lever and rotating the accessory at a constant angle, in a state in which the accessory is pushed to the front surface of the apparatus body from the front side.

In the spigot method, because the accessory is attached to the apparatus body by the operation of the lock lever and it is not necessary to rotate the entire accessory about the apparatus body, a degree of freedom of designing of the imaging apparatus is high. In addition, because it is not necessary to rotate the entire accessory with the large weight, the accessory can be easily attached to or detached from the apparatus body.

SUMMARY

However, in the imaging apparatus in which the accessory is attachable to or detachable from the apparatus body, normal communication should be performed between the accessory and the apparatus body in a state in which the accessory is attached to the apparatus body, to enable a lens group arranged in the interchangeable lens or a focus sensor provided in the adapter to be driven.

Therefore, the imaging apparatus is configured as follows. A plurality of contact terminals and a plurality of connection terminals are provided in the apparatus body and the accessory, respectively, the plurality of contact terminals and the plurality of connection terminals are connected when the accessory is attached to the apparatus body, and a signal can be exchanged between the apparatus body and the accessory.

Each of the contact terminals and each of the connection terminals have functions for a power supply and a ground and the contact terminals and detection terminals to detect that the other terminals are normally connected are provided in the contact terminals and the connection terminals. For this reason, the detection terminals should be connected finally in a state in which the other terminals are connected.

Therefore, in the imaging apparatus using the bayonet method, the contact terminals and the connection terminals are provided to be arranged in a circumferential direction and each detection terminal is positioned at one end in the circumferential direction. If the entire accessory is rotated about the apparatus body when the accessory is attached to the apparatus body, each contact terminal and each connection terminal are connected sequentially and the detection terminals are connected finally.

Meanwhile, in the imaging apparatus using the spigot method, because the contact terminals and the connection terminals are connected in a state in which the accessory is pushed to the front surface of the apparatus body from the front side, the detection terminals may not be connected after the other terminals are connected. Therefore, when the lock lever is operated and locking is made, an accurate detection operation may not be performed by the detection terminals.

It is desirable to provide an accessory, an imaging apparatus, and a detection method that enable an accurate detection operation with respect to a connection state of a plurality of contact terminals and a plurality of connection terminals.

Firstly, according to an embodiment of the present disclosure, there is provided an accessory that is attachable to or detachable from an apparatus body having a plurality of contact terminals. The accessory includes a plurality of connection terminals that are connected to the plurality of contact terminals, respectively, and exchange a signal with the apparatus body, when the plurality of connection terminals are attached to the apparatus body, a lock lever that is operated between a lock position and a non-lock position and performs locking with respect to the apparatus body, when the lock lever is operated to the lock position, and a detection activation section that starts a detection operation of a connection state of the plurality of contact terminals and the plurality of connection terminals, when the lock lever is operated to the lock position.

Therefore, in the accessory, the detection activation section is operated in a state in which the plurality of contact terminals and the plurality of connection terminals are connected, respectively.

Secondly, in the aforementioned accessory, it is preferable that the detection activation section includes a detection switch and an operation section that operates the detection switch and causes the detection switch to operate, and one of the detection switch and the operation section is arranged in a fixed state and the other one of the detection switch and the operation section is moved with the lock lever.

One of the detection switch and the operation section is arranged in a fixed state and the other moves with the lock lever. Therefore, one of the operation section and the detection switch moves and the detection switch is operated by the operation section.

Thirdly, in the aforementioned accessory, it is preferable that the detection switch is arranged in a fixed state, and the operation section is moved with the lock lever.

The detection switch is arranged in a fixed state and the operation section moves with the lock lever. Therefore, the operation section moves and the detection switch is operated by the operation section.

Fourthly, in the aforementioned accessory, it is preferable that the operation section is attached to the lock lever.

The operation section is attached to the lock lever. Therefore, the operation section moves according to movement of the lock lever.

Fifthly, in the aforementioned accessory, it is preferable that a contact-type switch that is operated by a contact of the operation section is used as the detection switch and an external surface of a portion of the operation section that comes into contact with the detection switch is formed in a shape of an outward convex curved surface.

The contact-type switch that is operated by the contact of the operation section is used as the detection switch and the external surface of the portion of the operation section that contacts the detection switch is formed in the shape of the outward convex curved surface. Therefore, the external surface of the operation section having the shape of the curved surface contacts the detection switch and the detection switch is operated by the operation section.

Sixthly, in the aforementioned accessory, it is preferable that a non-contact-type switch that is operated based on a change in a magnetic field is used as the detection switch.

The non-contact-type switch that is operated on the basis of the change in the magnetic field is used as the detection switch, and the detection switch is operated on the basis of the change in the magnetic field between the operation section and the detection switch.

Seventhly, in the aforementioned accessory, it is preferable that the accessory includes a click ball that is moved according to movement of the lock lever, a fixing section that has a rolling surface on which the click ball is rolled and is provided with a fitting recess into which the click ball is fitted, and a biasing spring that pushes the click ball to the rolling surface are provided, and the click ball is fitted into the fitting recess, when the lock lever moves to the lock position.

The click ball is fitted into the fitting recess, when the lock lever moves to the lock position. Therefore, a sense of touch when the lock lever moves to the lock position and locking of the lock lever is performed is transmitted to a user (operator).

Eighthly, in the aforementioned accessory, it is preferable that the accessory includes a spring case that holds the biasing spring, and the operation section is provided in the spring case.

The spring case that holds the biasing spring is provided and the operation section is provided in the spring case. Therefore, the biasing spring is held in the spring case and the detection switch is operated by a part of the spring case.

According to the embodiment of the present disclosure, there is provided an imaging apparatus including an apparatus body that has a plurality of contact terminals, and an accessory that is attachable to or detachable from the apparatus body and has a plurality of connection terminals which are connected to the plurality of contact terminals, respectively, and exchange a signal with the apparatus body, when the plurality of connection terminals are attached to the apparatus body. A lock lever that is operated between a lock position and a non-lock position and locks the accessory to the apparatus body when the lock lever is operated to the lock position and a detection activation section that starts a detection operation of a connection state of the plurality of contact terminals and the plurality of connection terminals, when the lock lever is operated to the lock position, are provided.

Therefore, in the imaging apparatus, the detection activation section is operated in a state in which the plurality of contact terminals and the plurality of connection terminals are connected, respectively.

According to the embodiment of the present disclosure, there is provided a detection method including attaching an accessory having a plurality of connection terminals to an apparatus body having a plurality of contact terminals and connecting the plurality of contact terminals to the plurality of connection terminals, respectively, and starting a detection operation of a connection state of the plurality of contact terminals and the plurality of connection terminals, when a lock lever operated between a lock position and a non-lock position is operated to the lock position and the accessory is locked to the apparatus body.

Therefore, in the detection method, the detection activation section is operated in a state in which the plurality of contact terminals and the plurality of connection terminals are connected, respectively.

According to the embodiments of the present disclosure described above, in the accessory, the imaging apparatus, and the detection method, the detection operation is performed in a state in which the plurality of contact terminals and the plurality of connection terminals are connected, respectively. Therefore, an accurate detection operation with respect to a connection state of a plurality of contact terminals and a plurality of connection terminals can be secured.

DETAILED DESCRIPTION OF THE EMBODIMENT(S)

Hereinafter, preferred embodiments of the present disclosure will be described in detail with reference to the appended drawings.

In the preferred embodiments to be described below, an imaging apparatus according to an embodiment of the present disclosure is applied to a digital still camera, an accessory according to an embodiment of the present disclosure is applied to an accessory in the digital still camera, and a detection method according to an embodiment of the present disclosure is applied to a detection method in the digital still camera.

However, the present disclosure is not limited to the digital still camera, the accessory in the digital still camera, and the detection method in the digital still camera. The present disclosure is applicable to various imaging apparatuses such as a video camera other than the digital still camera, accessories in the various imaging apparatuses, and detection methods in the various imaging apparatuses.

In the following description, it is assumed that forward, backward, upward, downward, leftward, and rightward directions are shown by directions viewed from a photographer when imaging is performed by the digital still camera. Therefore, an object side becomes a front side and a photographer side becomes a rear side.

The forward, backward, upward, downward, leftward, and rightward directions to be described below are defined only to simplify the description and the present disclosure is not limited thereto.

[Schematic Configuration of Imaging Apparatus]

Figure 1:
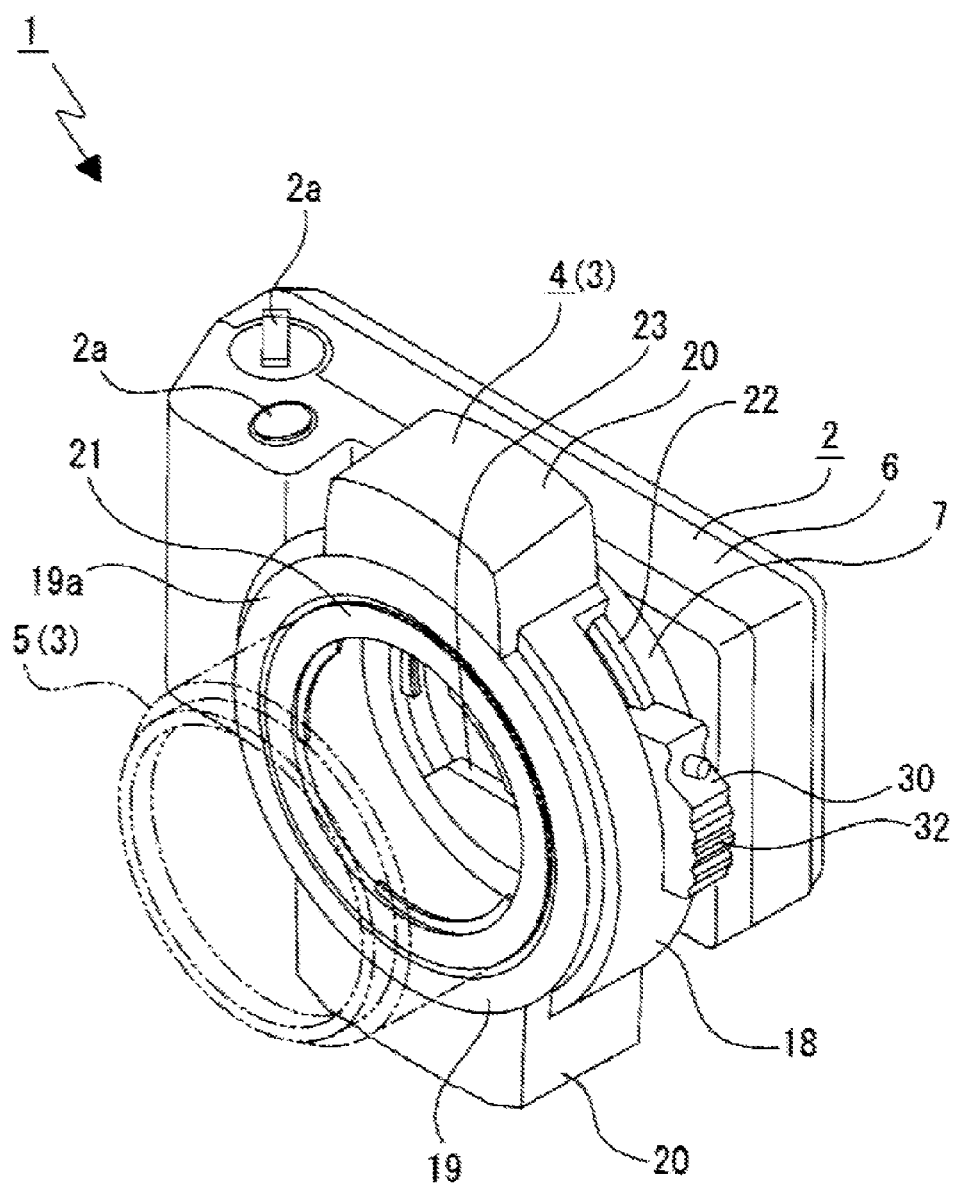
FIG. 1 is a diagram illustrating an embodiment of the present disclosure with FIGS. 2 to 18 and is a perspective view of an imaging apparatus.
Figure 2:
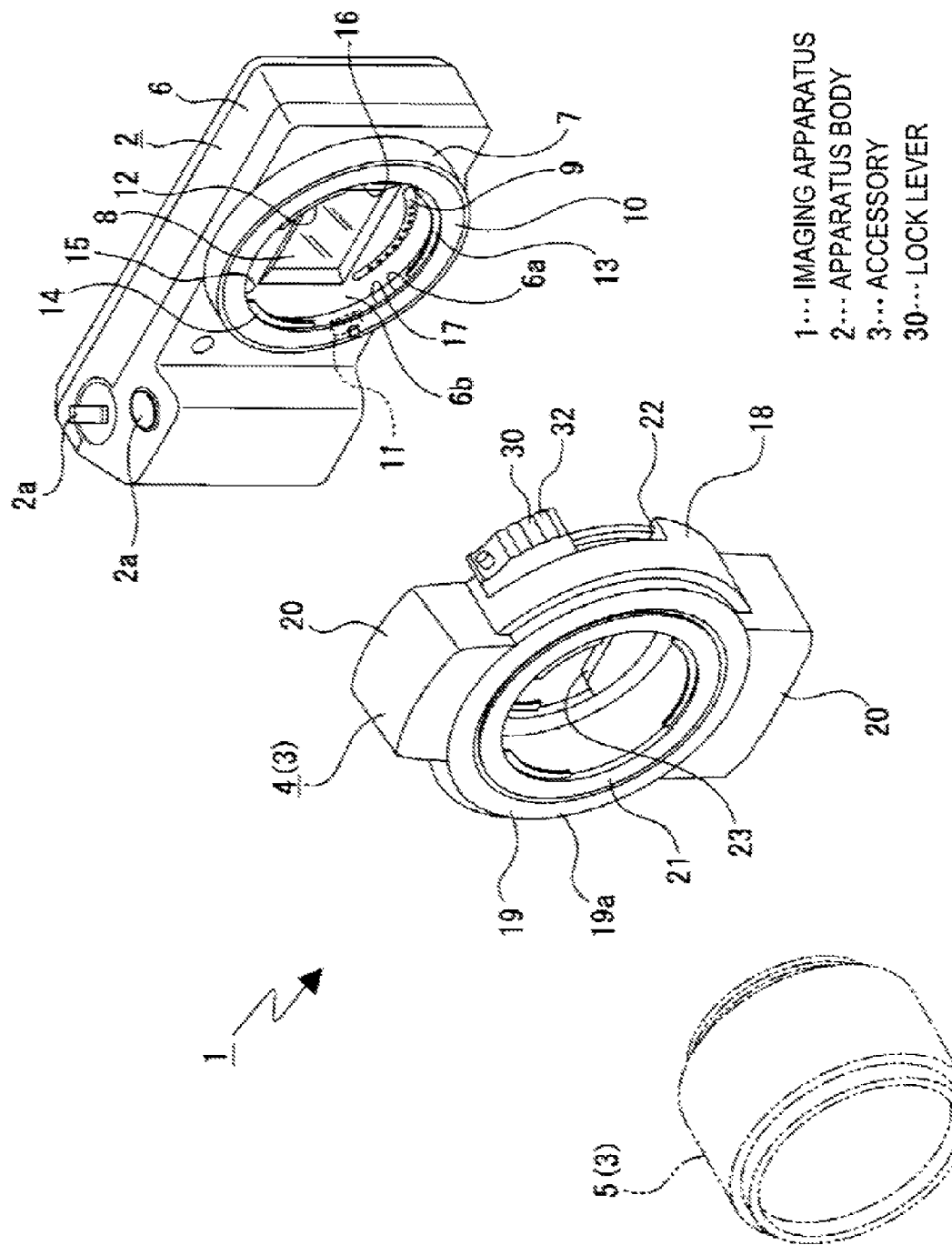
FIG. 2 is an exploded perspective view of the imaging apparatus.

An imaging apparatus 1 includes an apparatus body 2 and an accessory 3 (refer to FIGS. 1 and 2). The accessory 3 is configured using an adapter 4 and an interchangeable lens 5 or is configured using only the interchangeable lens 5. That is, when the interchangeable lens 5 is attached to the apparatus body 2 using the adapter 4, the accessory 3 is configured using the adapter 4 and the interchangeable lens 5. When the interchangeable lens 5 is attached to the apparatus body 2 without using the adapter 4, the accessory 3 is configured using only the interchangeable lens 5.

Hereinafter, the case in which the accessory 3 is configured using the adapter 4 and the interchangeable lens 5 will be described.

[Configuration of Apparatus Body]

The apparatus body 2 is formed by arranging necessary structural elements inside and outside a casing 6 (refer to FIGS. 1 and 2).

Various input operation sections 2a are arranged on a top surface of the casing 6. As the input operation sections 2a, a power supply button, a shutter button, and a mode switching knob are provided.

Various input operation sections and a display (not illustrated in the drawings) are arranged on a rear surface of the casing 6. As the input operation sections, a zoom switch and a mode switching knob are provided.

A circular opening 6a is formed in a front surface of the casing 6 and a surrounding portion of the opening 6a is provided as an attachment section 7 to attach the adapter 4.

An imaging element 8 such as a charge coupled device (CCD) or a complementary metal-oxide semiconductor (CMOS) is arranged in the casing 6 and the imaging element 8 is positioned at the rear side of the opening 6a.

In the casing 6, a contact arrangement section 6b that is oriented to the front side is provided at the rear side of the opening 6a and a contact section 9 is arranged in the contact arrangement section 6b. The contact section 9 is arranged on a lower end of the contact arrangement section 6b and is formed in a circular arc shape. The contact section 9 has a plurality of contact terminals 9a positioned to be apart from each other in a longitudinal direction (circumferential direction) and is arranged at a position along the opening 6a at the rear side of the opening 6a.

A mount ring 10 that is formed in a shape of a thin ring oriented in a forward-to-backward direction is provided in the attachment section 7 and a protrusion arrangement hole that is penetrated in a forward-to-backward direction is formed at a position close to a right end of the mount ring 10.

Figure 3:
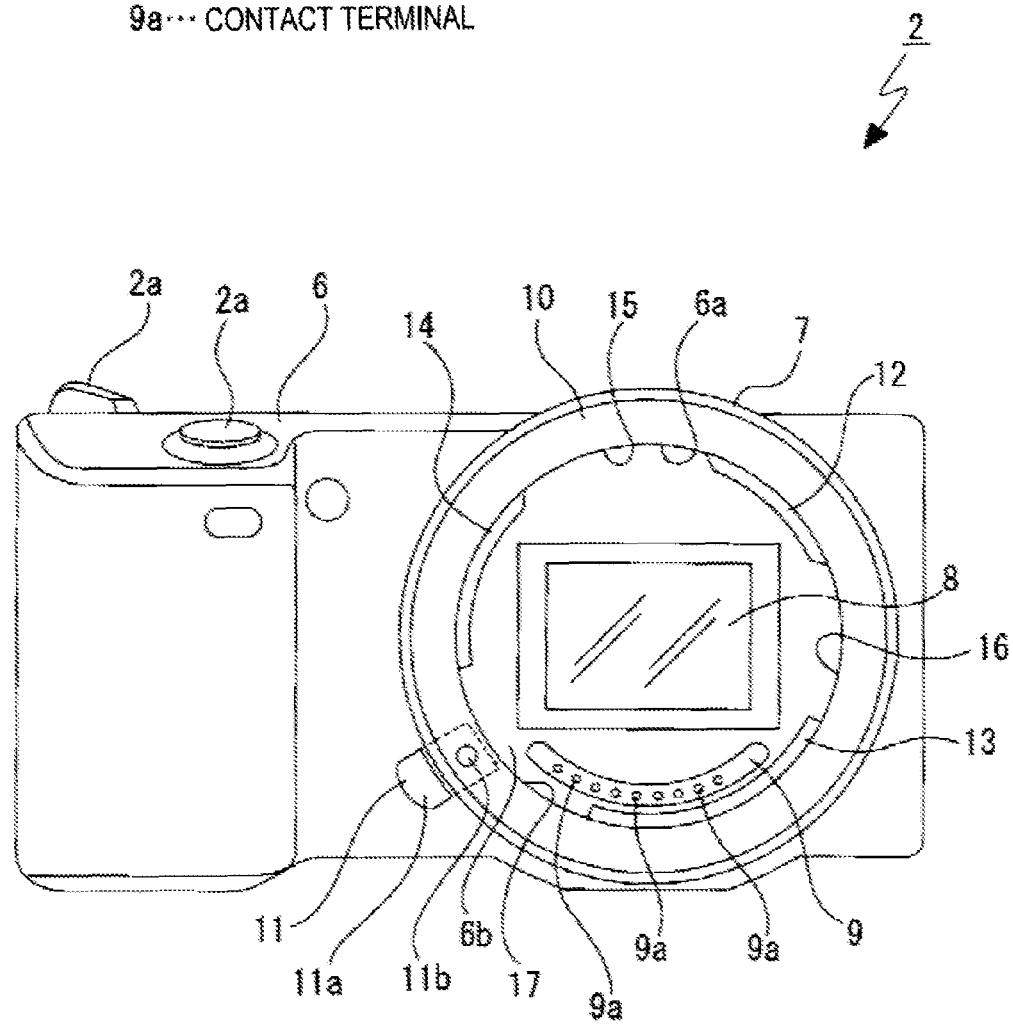
FIG. 3 is a front view of an apparatus body.

In the attachment section 7, a release button 7 is arranged (refer to FIG. 3). The release button 11 is movable in a forward-to-backward direction and has a pressing operation section 11a and a regulation protrusion 11b, and the pressing operation section 11a and the regulation protrusion 11b are integrated with each other and move in a forward-to-backward direction. The release button 11 is biased forward by a spring member not illustrated in the drawings, the pressing operation section 11a is positioned at the outside of the mount ring 10, and a leading end of the regulation protrusion 11b protrudes forward from the protrusion arrangement hole of the mount ring 10, by the biasing force of the spring member.

In the attachment section 7, engagement projections 12, 13, and 14 are provided at the inner circumferential side of the mount ring 10 to be apart from each other in a circumferential direction. The engagement projections 12, 13, and 14 are formed in a circular arc shape along the mount ring 10 and the lengths of the engagement projections 12, 13, and 14 in a circular arc direction are different from each other. At the rear sides of the engagement projections 12, 13, and 14, spaces are formed between the contact arrangement section 6b and the engagement projections and portions (spaces) between the engagement projections 12, 13, and 14 are formed as insertion sections 15, 16, and 17. The lengths of the insertion sections 15, 16, and 17 in a circumferential direction are different from each other.

[Configuration of Adapter]

The adapter 4 is formed by arranging necessary structural elements inside and outside a body 18 (refer to FIGS. 1, 2, 4, and 5).

The body 18 includes an attached section 19 of which a forward-to-backward direction is an axial direction and is formed in an approximately cylindrical shape and protrusions 20 which protrude forward and downward from the attached section 19, respectively. Functional sections (not illustrated in the drawings) which show a predetermined function, for example, automatic focus sensors are embedded in the protrusions 20.

A coupling ring 21 that is formed in a shape of a thin ring oriented in a forward-to-backward direction is attached to a front surface 19a of the attached section 19 (refer to FIGS. 1 and 2). The interchangeable lens 5 is coupled to the coupling ring 21. The interchangeable lens 5 is attached to the adapter 4 using the bayonet method of rotating the entire interchangeable lens 5 about the adapter 4 and attaching the interchangeable lens to the adapter or the spigot method of operating a lever not illustrated in the drawings and attaching the interchangeable lens to the adapter. A lock mechanism not illustrated in the drawings is provided on the front surface side of the attached section 19 and the interchangeable lens 5 is attached to the coupling ring 21 of the adapter 4 in a state in which the interchangeable lens is locked by the lock mechanism.

Figure 4:
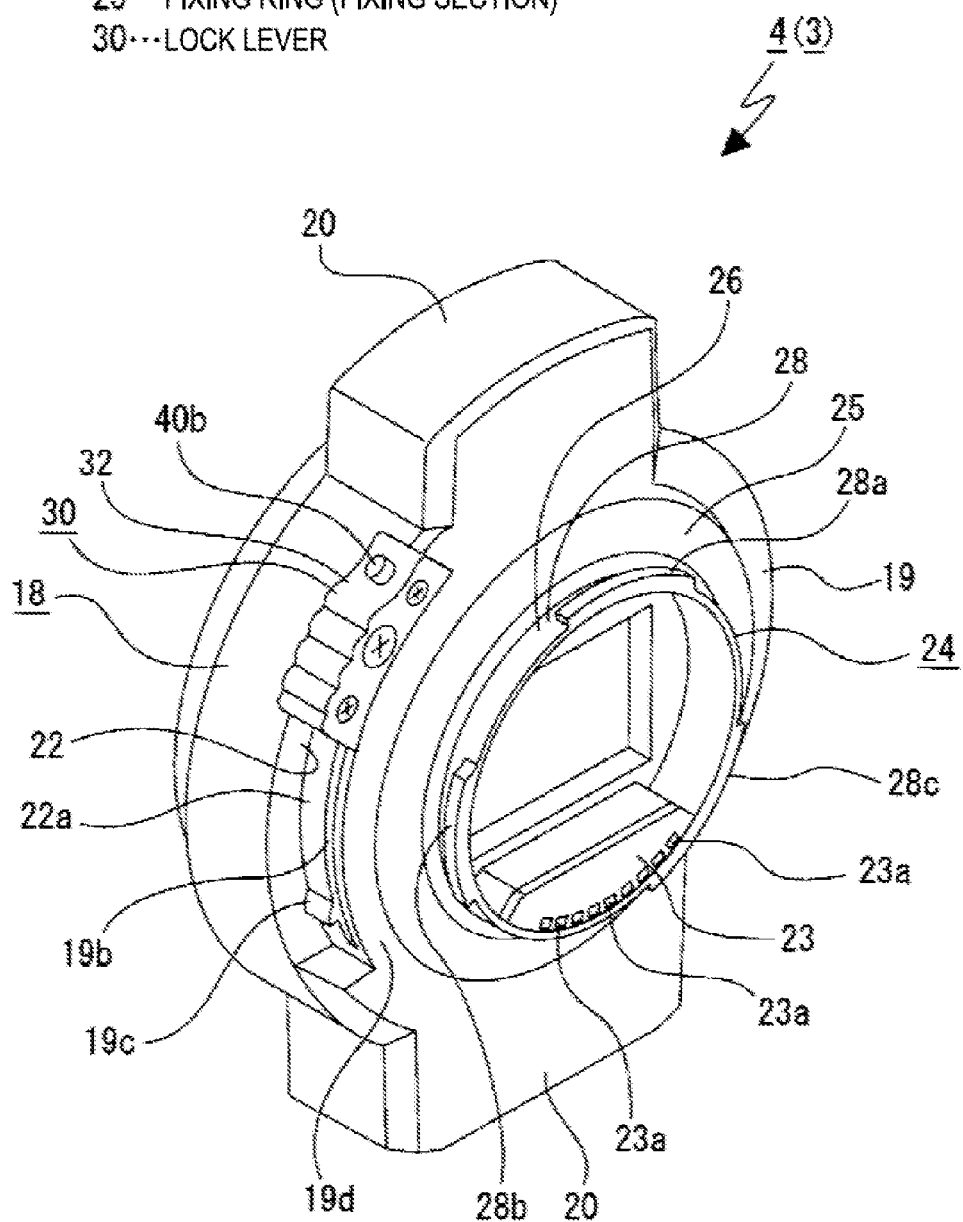
FIG. 4 is a perspective view of an adapter.
Figure 5:
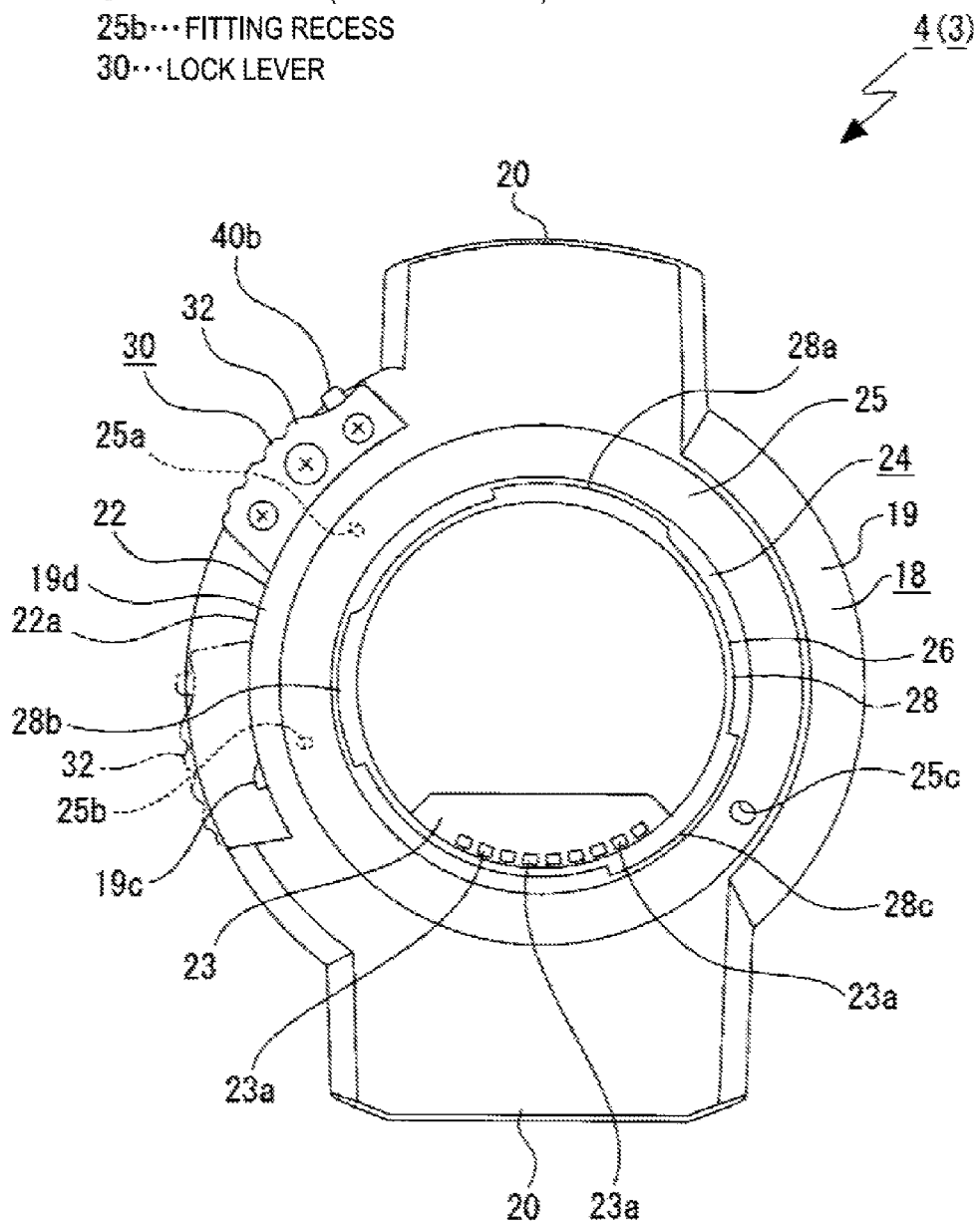
FIG. 5 is a rear view of the adapter.

A movement notch 22 that is opened to the lateral side (left side) and the rear side and extends in a circumferential direction is formed in the attached section 19 (refer to FIGS. 4 and 5). The movement notch 22 and a penetrated insertion slit 19b are formed in the attached section 19. The insertion slit 19b is opened to a bottom surface 22a that forms the movement notch 22 and is oriented outward and extends in a circumferential direction.

A lock protrusion 19c that protrudes outward from the bottom surface 22a of the movement notch 22 is provided in the attached section 19 and the lock protrusion 19c is positioned right in front of a lower end of the insertion slit 19b.

A connection section 23 is arranged in the body 18. The connection section 23 is arranged at a position close to a lower end of the attached section 19 and protrudes backward from the attached section 19. The connection section 23 has a plurality of connection terminals 23a that are positioned to be apart from each other in a longitudinal direction (circumferential direction). The connection terminals 23a of the number that is equal to the number of the contact terminals 9a provided in the contact section 9 of the apparatus body 2 are provided at the same pitch.

A removable section 24 is provided on a rear surface 19d of the attached section 19. The removable section 24 has a fixing ring 25 and a movable ring 26.

The fixing ring 25 is formed in a shape of a thin ring oriented in a forward-to-backward direction and is fixed.

Figure 6:
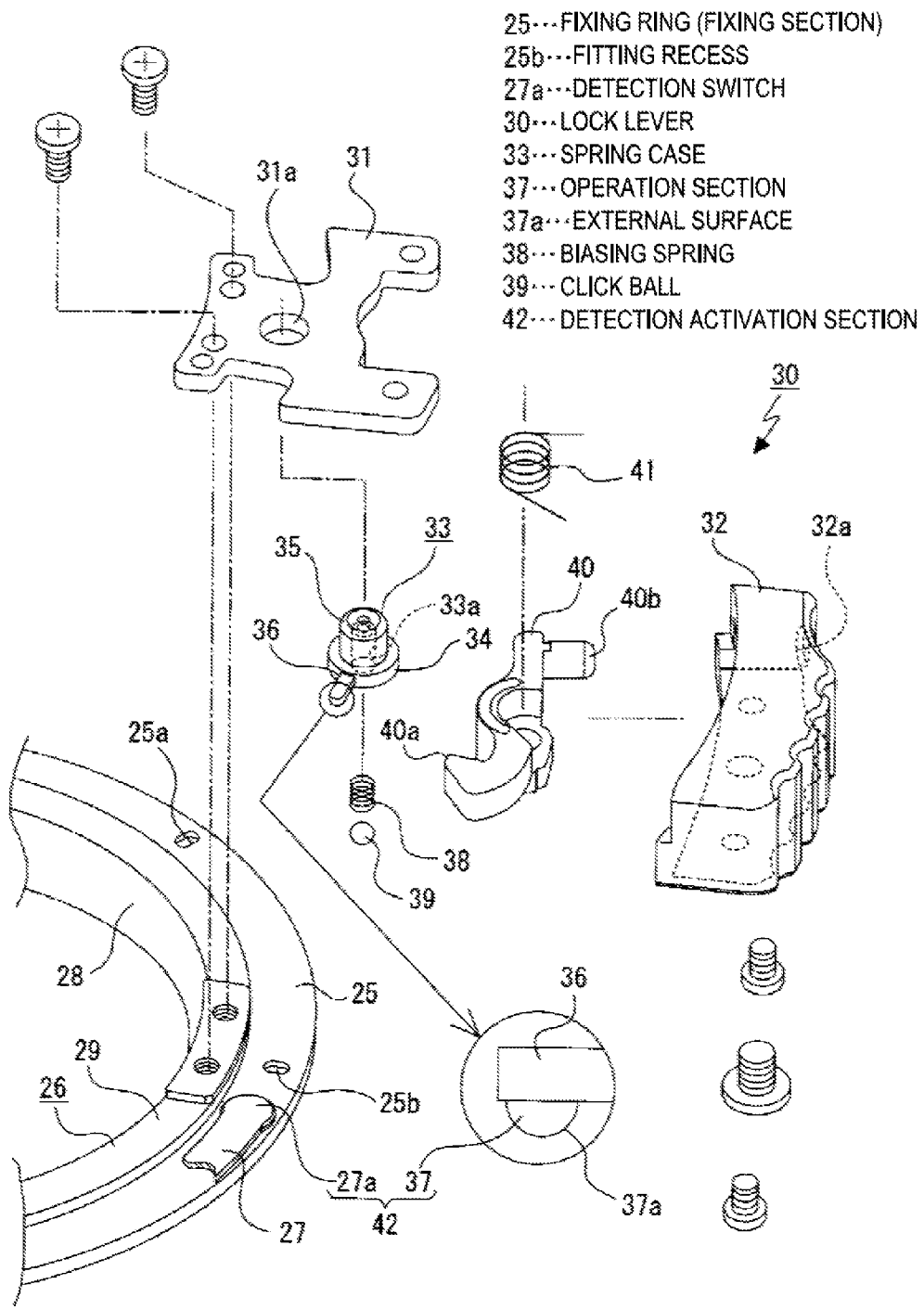
FIG. 6 is an enlarged exploded perspective view illustrating a lock lever.

In the fixing ring 25, fitting recesses 25a and 25b that is opened to the front side are formed in a portion of a left-end side to be apart from each other in a circumferential direction and a rotation regulation hole 25c is formed in a portion of a right end side (refer to FIGS. 4 to 6).

One end of a wiring plate 27 is attached to a front surface of the fixing ring 25, in the vicinity of the fitting recess 25b positioned at the lower side. The wiring plate 27 is a flexible printed wiring plate and one end thereof functions as a detection switch 27a and the other end thereof functions as a connection terminal section not illustrated in the drawings.

Figure 7:
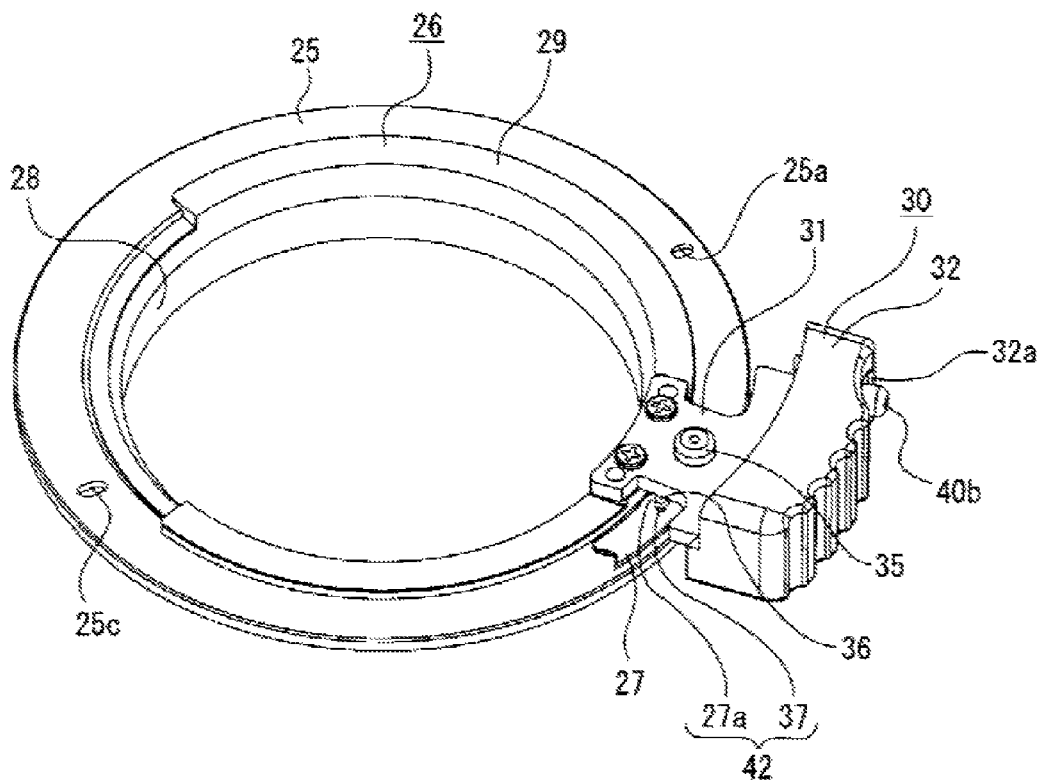
FIG. 7 is a perspective view illustrating a fixing ring, a movable ring, and a lock lever.

The movable ring 26 includes an approximately cylindrical ring section 28 and a coupling surface section 29 that protrudes outward from a portion, except for a part of the ring section 28 at a front edge (refer to FIG. 7).

The ring section 28 has engagement sections 28a, 28b, and 28c that are formed to be short in an axial direction and protrude outward from a rear end (refer to FIGS. 4 and 5). The engagement sections 28a, 28b, and 28c are formed in a circular arc shape and have the lengths in a circumferential direction slightly shorter than the lengths in a circumferential direction, of the insertion sections 15, 16, and 17 formed between the engagement projections 12, 13, and 14 of the mount ring 10 in the apparatus body 2. The movable ring 26 is rotatable about the fixing ring 25, in a state in which the ring section 28 protrudes backward from an inner opening edge of the fixing ring 25 and the coupling surface section 29 faces a front surface of the fixing ring 25.

Figure 8:
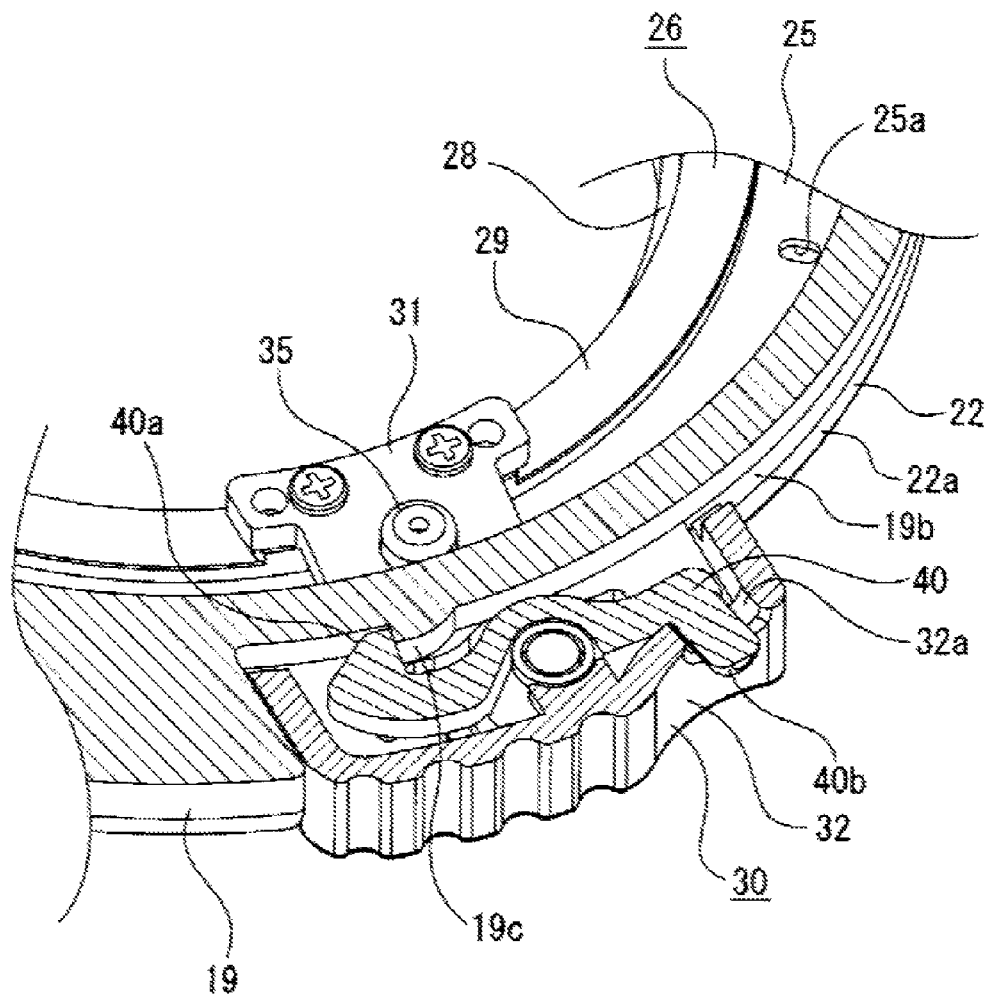
FIG. 8 is an enlarged perspective view illustrating the lock lever.

A lock lever 30 is coupled to a front surface of the coupling surface section 29 in the movable ring 26 by screwing (refer to FIGS. 6 and 8).

The lock lever 30 has a connection arm 31 and an operated section 32 to be attached to one end of the connection arm 31.

An intermediate section of the connection arm 31 is inserted into the insertion slit 19b formed in the attached section 19 of the body 18, an inner end thereof is attached to the coupling surface section 29 by screwing, and an outer end thereof is positioned in the movement notch 22 of the attached section 19.

An arrangement hole 31a that is penetrated in an upward-to-downward direction is formed in the intermediate section of the connection arm 31 and a spring case 33 is inserted into and arranged in the arrangement hole 31a.

The spring case 33 includes a base section 34 that has a shape of a circular plate oriented in a forward-to-backward direction, an insertion shaft section 35 that protrudes backward from the base section 34, an arm section 36 that protrudes laterally from an outer circumferential surface of the base section 34, and an operation section 37 that protrudes backward from a leading end of the arm section 36 (refer to FIG. 6).

A spring support hole 33a that is opened to a rear surface of the base section 34 is formed in the spring case 33 and a biasing spring 38 that is a compression coil spring is arranged in the spring support hole 33a.

The base section 34 and the insertion shaft section 35 are positioned on the same axis and an outer diameter of the insertion shaft section 35 is smaller than an outer diameter of the base section 34.

The operation section 37 has an approximately semispherical shape to be a convex shape at the rear side and an external surface 37a thereof is formed in a shape of a curved surface (shape of a spherical surface).

In the spring case 33, the insertion shaft section 35 is inserted into the arrangement hole 31a of the connection arm 31 from the rear side. In a state in which the insertion shaft section 35 is inserted into the arrangement hole 31a, a click ball 39 is supported to a rear end of the biasing spring 38 and the biasing force of the biasing spring 38 is applied to the click ball 39. Therefore, the click ball 39 is pushed to the front surface of the fixing ring 25 by the biasing force of the biasing spring 38.

The operated section 32 is formed in a shape of a box opened to the inner side (right side), is attached to the outer end of the connection arm 31 by screwing, and is positioned in the movement notch 22. A pin insertion hole 32a that is penetrated in an approximately leftward-to-rightward direction is formed in an upper end of the operated section 32.

A lock piece 40 is rotatably supported to the operated section 32 (refer to FIGS. 6 and 8). The lock piece is formed in a shape in which a rotation fulcrum shaft extends in a forward-to-backward direction and extends in an approximately upward-to-backward direction. The lock piece 40 has a lock engagement section 40a protruding inward at a lower end thereof and has an operation pin 40b protruding outward at an upper end thereof. A portion of the lock piece 40 other than the operation pin 40b is positioned in the operated section 32 and the operation pin 40b is inserted into the pin insertion hole 32a and a leading end thereof protrudes outward from the operated section 32.

A torsion coil spring 41 is arranged in the operated section 32 and the lock piece 40 is based in a direction in which the lock engagement section 40a comes close to a bottom surface 22a of the movement notch 22. Therefore, the lock engagement section 40a of the lock piece 40 is pushed to the bottom surface 22a of the movement notch 22 by the biasing force of the torsion coil spring 41.

The operated section 32 of the lock lever 30 is movable in the movement notch 22 and the lock lever 30 moves between a non-lock position to be an upper movement end and a lock position to be a lower movement end. The movable ring 26 rotates according to the movement of the lock lever 30.

A lens group (not illustrated in the drawings) and a driving mechanism (not illustrated in the drawings) for moving the lens group in an optical axis direction are arranged in the interchangeable lens 5. The driving mechanism is operated according to an instruction from a control section (not illustrated in the drawings) arranged in the apparatus body 2, in a state in which the interchangeable lens 5 and the apparatus body 2 can perform communication with each other.

[Operation when Adapter is Attached to Apparatus Body]

Hereinafter, an operation when the adapter 4 is attached to the apparatus body 2 will be described (refer to FIGS. 9 to 15).

Figure 9:
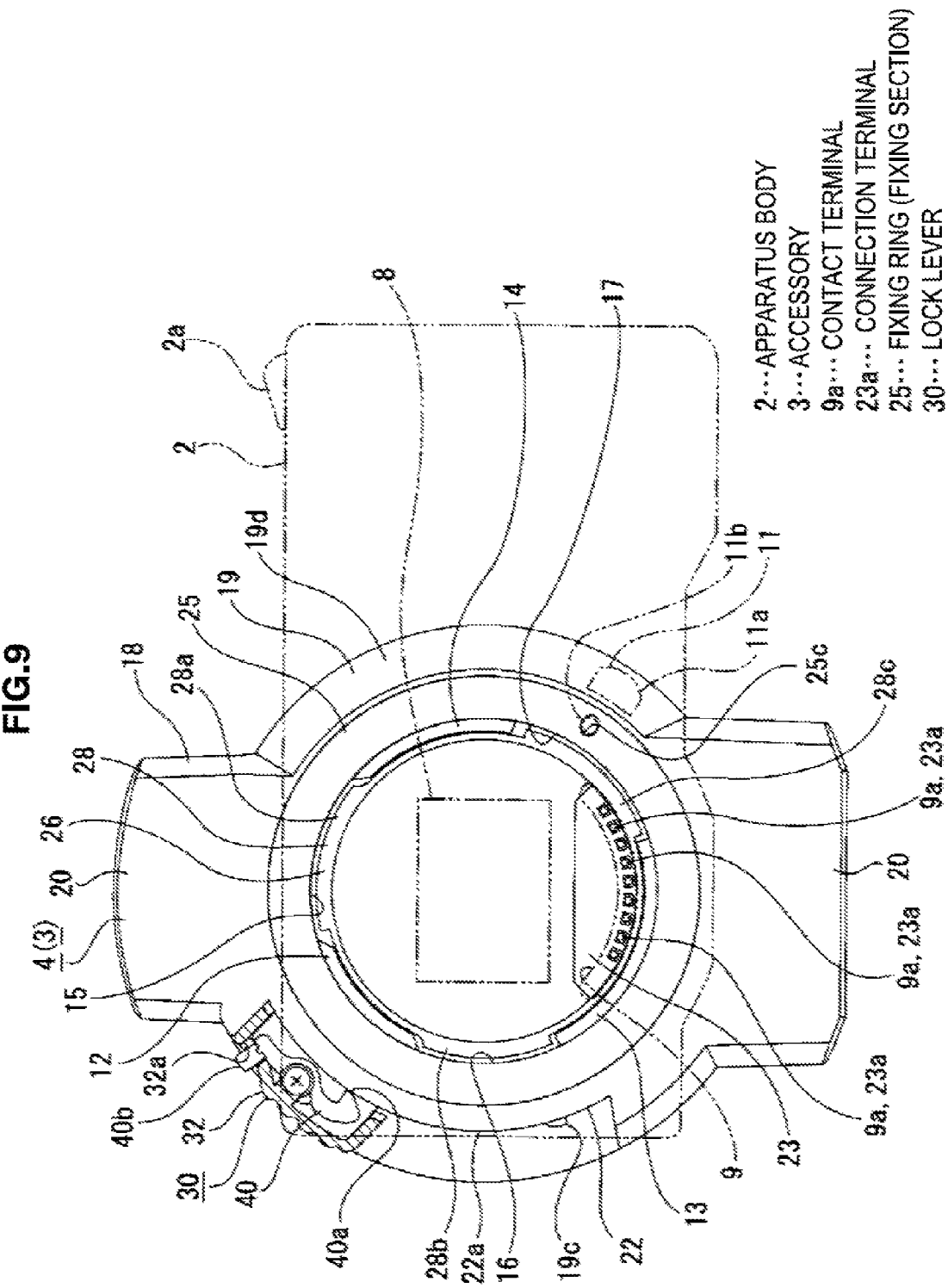
FIG. 9 is a diagram illustrating an operation when the adapter is attached to or detached from the apparatus body with FIGS. 10 to 15 and is a partially cut schematic front view illustrating a state of a lock piece when the lock lever is at a non-lock position.
Figure 10:
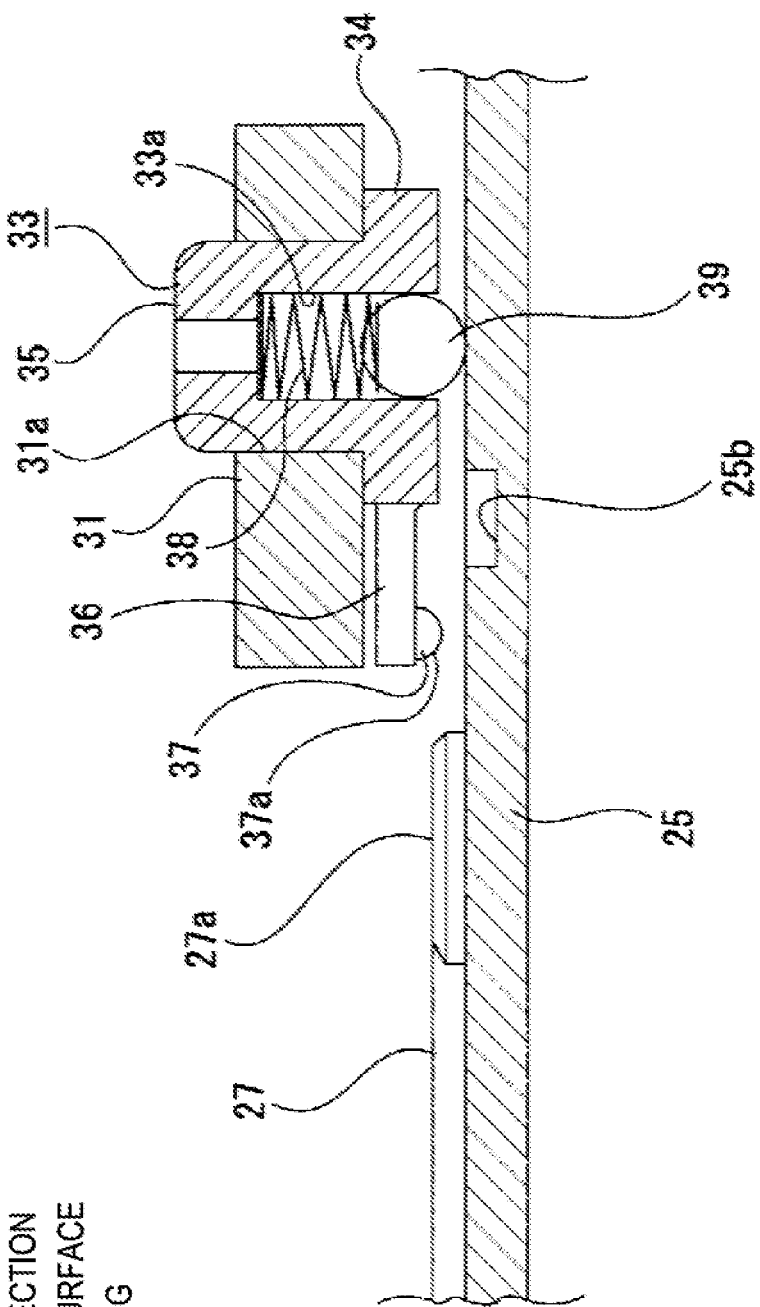
FIG. 10 is a partially cut schematic enlarged side view illustrating a position of an operation section with respect to a detection switch when the lock lever is at the non-lock position.
Figure 11:
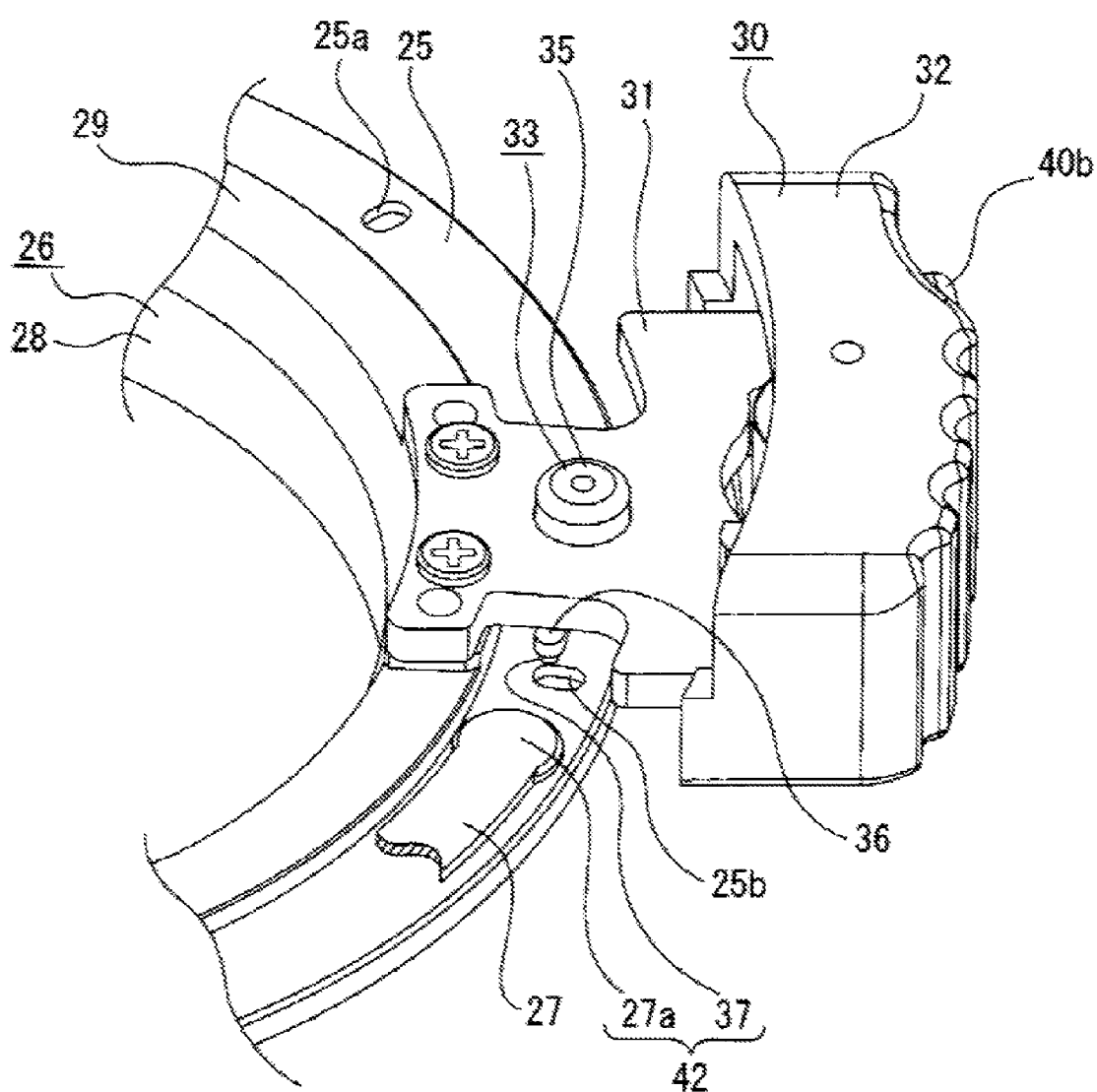
FIG. 11 is an enlarged perspective view illustrating a position of the operation section with respect to the detection switch when the lock lever is at the non-lock position.
Figure 12:
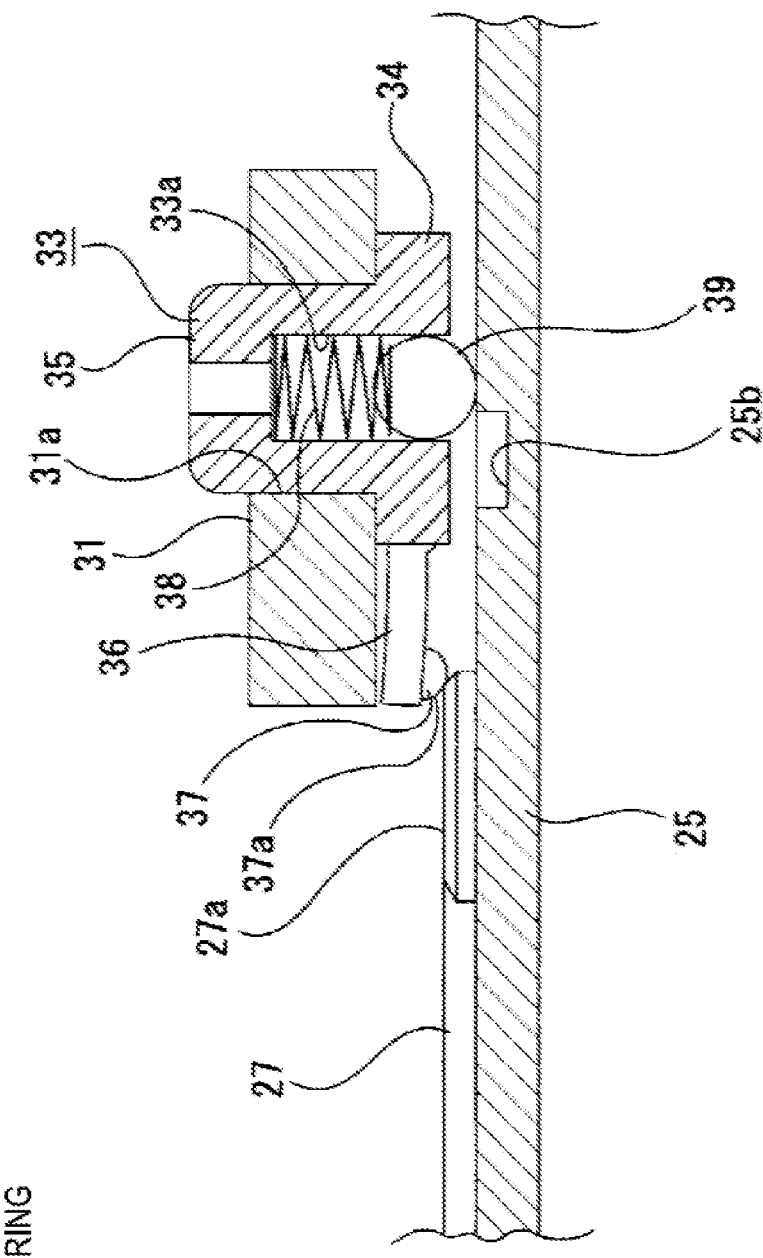
FIG. 12 is a partially cut schematic enlarged side view illustrating a position of the operation section with respect to the detection switch while the lock lever is operated from the non-lock position to a lock position.

First, the adapter 4 is arranged at the non-lock position (refer to FIG. 9). In a state in which the adapter 4 is arranged at the non-lock position, the operation section 37 of the spring case 33 is apart from the detection switch 27a of the wiring plate 27 attached to the fixing ring 25 in a circumferential direction and the click ball 39 is pushed to the front surface of the fixing ring 25 by the biasing force of the biasing spring 38 (refer to FIGS. 10 and 11). At this time, the click ball 39 is inserted partially into the fitting recess 25 that is formed in the fixing ring 25.

Next, the engagement sections 28a, 28b, and 28c in the ring section 28 of the movable ring 26 of the adapter 4 are inserted into the insertion sections 15, 16, and 17 formed between the engagement projections 12, 13, and 14 and the fixing ring 25 is pushed to the mount ring 10 of the apparatus body 2 from the front side. At this time, as described above, the lengths of the engagement sections 28a, 28b, and 28c are different from the lengths of the insertion sections 15, 16, and 17. Therefore, because the adapter 4 is not attached to the apparatus body 2 in directions other than a direction in which the engagement sections 28a, 28b, and 28c are positioned to correspond to the insertion sections 15, 16, and 17, the adapter 4 is prevented from being attached to the apparatus body 2 in erroneous directions.

If the fixing ring 25 of the adapter 4 is pushed to the mount ring 10 of the apparatus body 2 from the front side, the regulation protrusion 11b of the release button 11 is inserted into the rotation regulation hole 25c of the fixing ring 25 and rotation of the adapter 4 about the apparatus body 2 is regulated. At this time, the connection terminals 23a of the connection section 23 in the adapter 4 are connected to the contact terminals 9a of the contact section 9 in the apparatus body 2, respectively. In addition, a connection terminal section that is provided in the other end of the wiring plate 27 of the adapter 4 is connected to a terminal section (not illustrated in the drawings) of the apparatus body 2.

Next, the lock lever 30 is operated from the non-lock position to the lock position. When the lock lever 30 is operated to the lock position, the movable ring 26 rotates integrally with the lock lever 30 and the engagement sections 28a, 28b, and 28c of the movable ring 26 are inserted into the spaces of the rear sides of the engagement projections 12, 13, and 14, respectively. At this time, the lock engagement section 40a of the lock piece 40 is slid on the bottom surface 22a of the movement notch 22 and the click ball 39 is slid on the front surface of the fixing ring 25. The operation section 37 of the spring case 33 contacts an edge of one end of the detection switch 27a of the wiring plate 27 (refer to FIG. 12).

Figure 13:
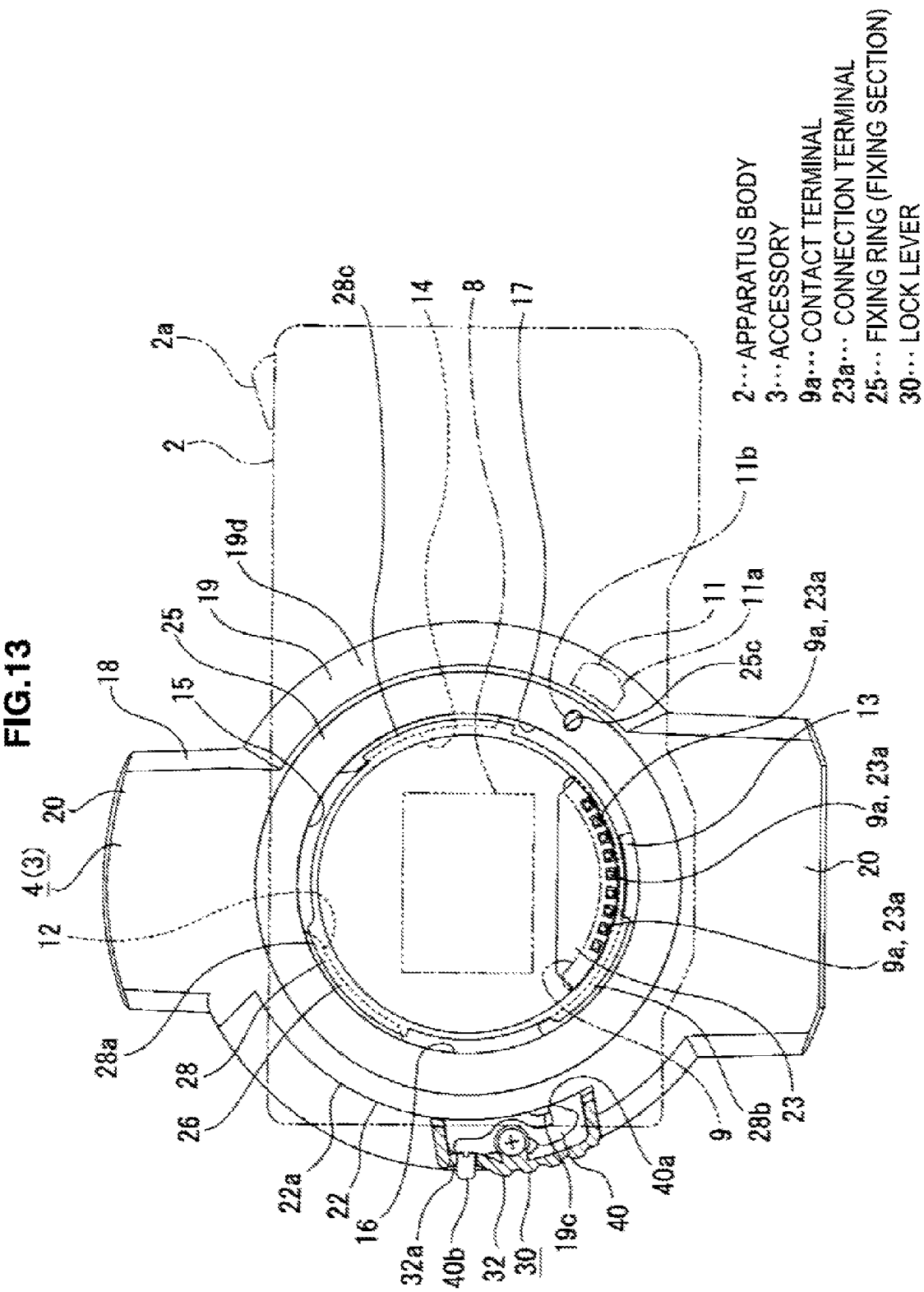
FIG. 13 is a partially cut schematic front view illustrating a state of the lock piece when the lock lever is at the lock position.

If the lock lever 30 is continuously operated and moves to the lock position, the engagement sections 28a, 28b, and 28c of the movable ring 26 are inserted into the spaces of the rear sides of the engagement projections 12, 13, and 14, respectively, and are engaged with the engagement projections 12, 13, and 14, respectively (refer to FIG. 13).

When the lock lever 30 moves to the lock position, the lock engagement section 40a of the lock piece 40 is slid on the lock protrusion 19c, is rotated by the biasing force of the torsion coil spring 41 after being rotated against the biasing force of the torsion coil spring 41 for the moment, and is engaged with the lock protrusion 19c. Therefore, the rotation of the movable ring 26 is regulated, an engagement state of the engagement sections 28a, 28b, and 28c with respect to the engagement projections 12, 13, and 14 is maintained, and the adapter 4 is locked to the apparatus body 2.

Figure 14:
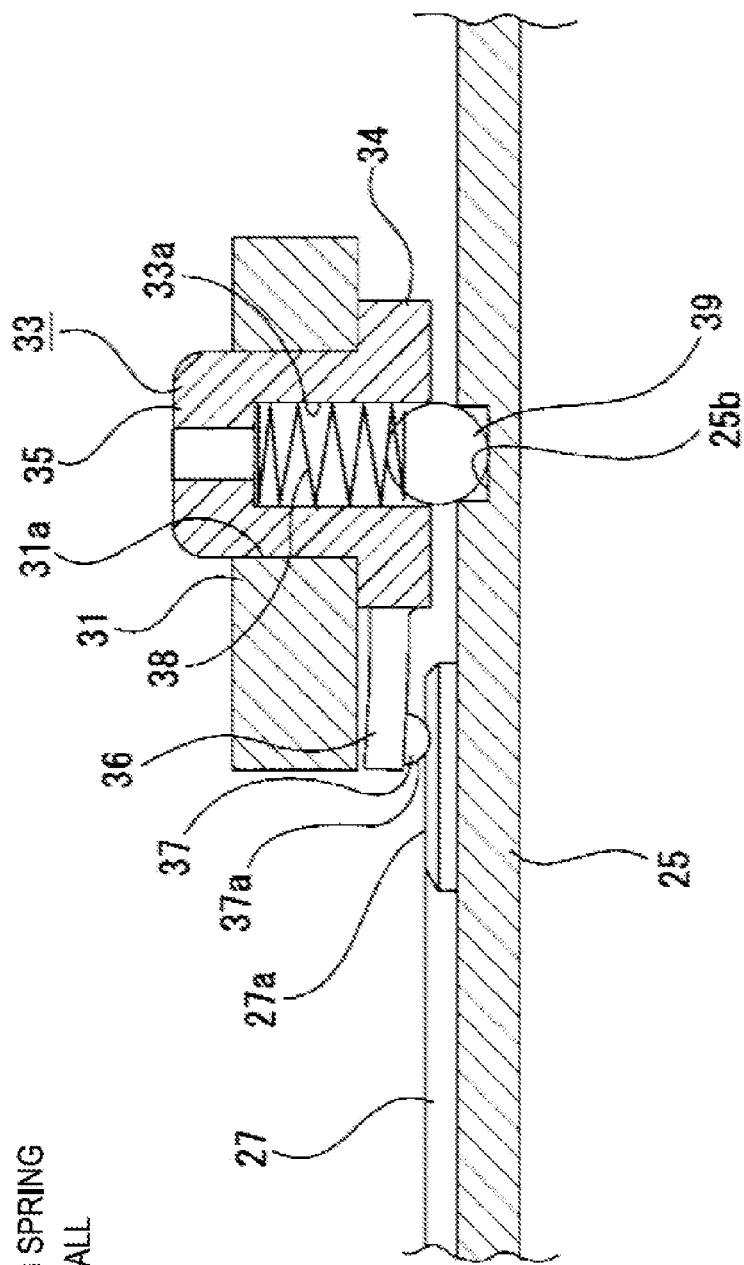
FIG. 14 is a partially cut schematic enlarged side view illustrating a position of the operation section with respect to the detection switch when the lock lever is at the lock position.

At the same time as when the lock lever 30 moves to the lock position, the click ball 39 moves above the fitting recess 25b of the fixing ring 25 and a part of the click ball is inserted into the fitting recess 25b by the biasing force of the biasing spring 38 (refer to FIG. 14). Therefore, a sense of touch when the lock lever 30 moves to the lock position and locking of the lock lever 30 is performed is transmitted as a so-called sense of click to a user (operator).

As such, the part of the click ball 39 is inserted into the fitting recess 25b and the sense of touch when the lock lever 30 moves to the lock position and locking of the lock lever 30 is performed is transmitted to the user. Therefore, usability can be improved.

Figure 15:
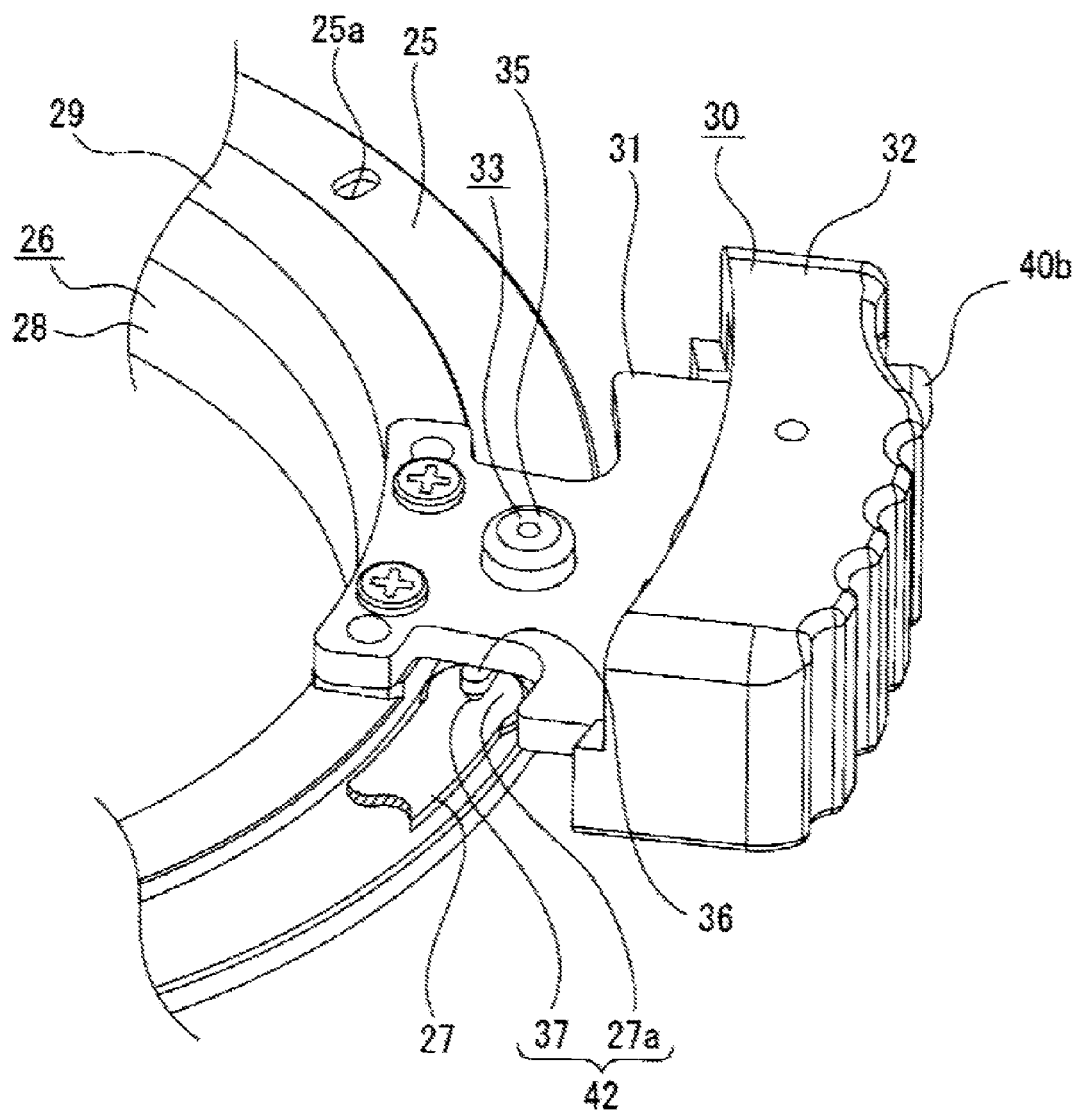
FIG. 15 is an enlarged perspective view illustrating a position of the operation section with respect to the detection switch when the lock lever is at the lock position.

When the lock lever 30 moves to the lock position, the operation section 37 of the spring case 33 is mounted on the detection switch 27a of the wiring plate 27 and the detection switch 27a is operated by the operation section 37 (refer to FIGS. 14 and 15).

At this time, because the external surface 37a of the operation section 37 is formed in a shape of a curved surface, the operation section 37 is smoothly mounted on the detection switch 27a and the detection switch 27a can be securely and smoothly operated by the operation section 37.

Because the external surface 37a of the operation section 37 is formed in a shape of a curved surface, the detection switch 27a can be prevented from being damaged when the detection switch 27a is operated by the operation section 37.

The part of the connection arm 31 is positioned at the front side of the leading end of the arm section 36 to come close to the leading end (refer to FIG. 14) and the arm section 36 is prevented from being excessively bent when the operation section 37 is mounted on the detection switch 27a. Therefore, the detection switch 27a can be securely operated by the operation section 37.

As described above, when the detection switch 27a is operated by the operation section 37, a detection operation to detect whether all of the connection terminals 23a of the connection section 23 in the adapter 4 are connected to all of the contact terminals 9a of the contact section 9 in the apparatus body 2 starts. That is, if the detection switch 27a is operated by the operation section 37, an operation signal is transmitted to the control section of the apparatus body 2 through the wiring plate 27 and the terminal section of the apparatus body 2 to which the other end of the wiring plate 27 is connected, the control section is operated on the basis of the transmitted operation signal, and a connection state of the contact terminals 9a and the connection terminals 23a is detected.

As described above, when the detection switch 27a is operated by the operation section 37, the detection operation of the connection state of all of the contact terminals 9a and all of the connection terminals 23a is performed and the operation section 37 and the detection switch 27a function as a detection activation section 42 that starts the detection operation.

If it is detected by the detection operation of the control section that all of the contact terminals 9a and all of the connection terminals 23a are connected to each other, a signal showing a normal connection state is transmitted and normal communication is performed between the apparatus body 2 and the adapter 4 and the interchangeable lens 5.

Meanwhile, if it is detected by the detection operation of the control section that at least one of the contact terminals 9a and at least one of the connection terminals 23a are abnormally connected to each other, a signal showing an abnormal connection state is transmitted and communication is disabled between the apparatus body 2 and the adapter 3 and the interchangeable lens 5.

When the adapter 4 is detached from the apparatus body 2, first, the operation pin 40b of the lock piece 40 is pressed. If the operation pin 40b of the lock piece 40 is pressed, the lock piece 40 is rotated against the biasing force of the torsion coil spring 41, engagement of the lock engagement section 40a and the lock protrusion 19c is released, and locking of the adapter 4 with respect to the apparatus body 2 is released.

Next, in a state in which the locking of the adapter 4 with respect to the apparatus body 2 is released, the lock lever 30 is operated and is moved from the lock position to the non-lock position. If the lock lever 30 moves to the non-lock position, engagement of the engagement sections 28a, 28b, and 28c of the movable ring 26 and the engagement projections 12, 13, and 14 is released.

At the same time as when the lock lever 30 moves to the non-lock position, the click ball 39 moves above the fitting recess 25a of the fixing ring 25 and a part of the click ball 39 is inserted into the fitting recess 25a by the biasing force of the biasing spring 38. Therefore, a sense of touch when the lock lever 30 moves to the non-lock position is transmitted as a so-called sense of click to the user (operator).

Finally, the adapter 4 is detached from the apparatus body 2 by drawing the adapter 4 from the apparatus body 2 to the front side.

[Modification]

In the above case, the contact-type detection switch 27a that is operated by a contact with the operation section 37 has been described. However, the detection switch may be a non-contact-type detection switch to be described below (refer to FIGS. 16 and 17).

One end of a wiring plate 27A is attached to the front surface of the fixing ring 25. The wiring plate 27A is a flexible printed wiring plate and one end thereof functions as a detection switch 27b and the other end thereof functions as a connection terminal section not illustrated in the drawings. As the detection switch 27b, a magnetic detection element is used.

A spring case 33A includes a base section 34, an insertion shaft section 35, an arm section 36, and an operation section 37A provided in a leading end of the arm section 36. A magnet is embedded in the operation section 37A.

Figure 16:
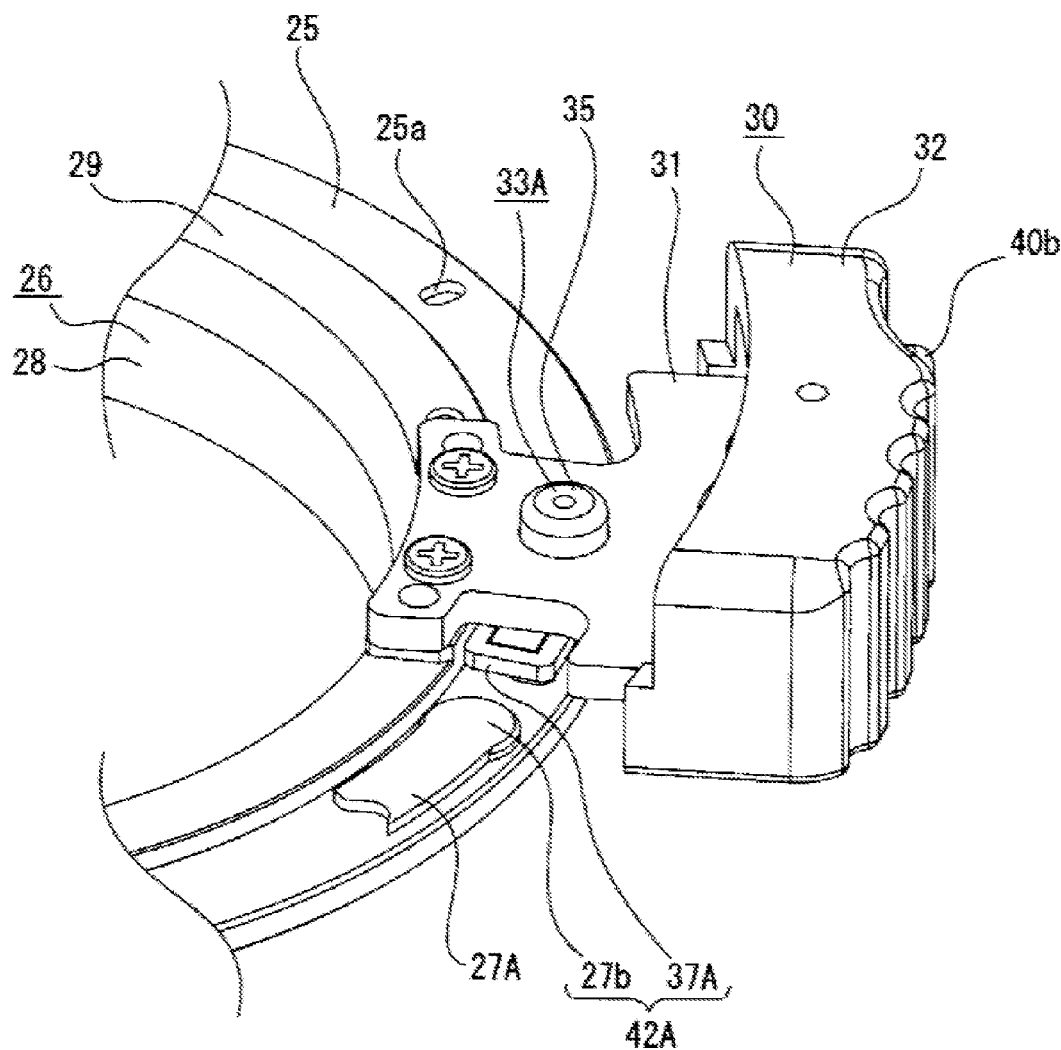
FIG. 16 is a diagram illustrating the case in which a non-contact-type switch is used as the detection switch with FIG. 17 and is an enlarged perspective view illustrating a position of the operation section with respect to the detection switch when the lock lever is at the non-lock position.

In a state in which the lock lever 30 is arranged at a non-lock position, the operation section 37A is apart from the detection switch 27b of the wiring plate 27A in a circumferential direction (refer to FIG. 16).

Figure 17:
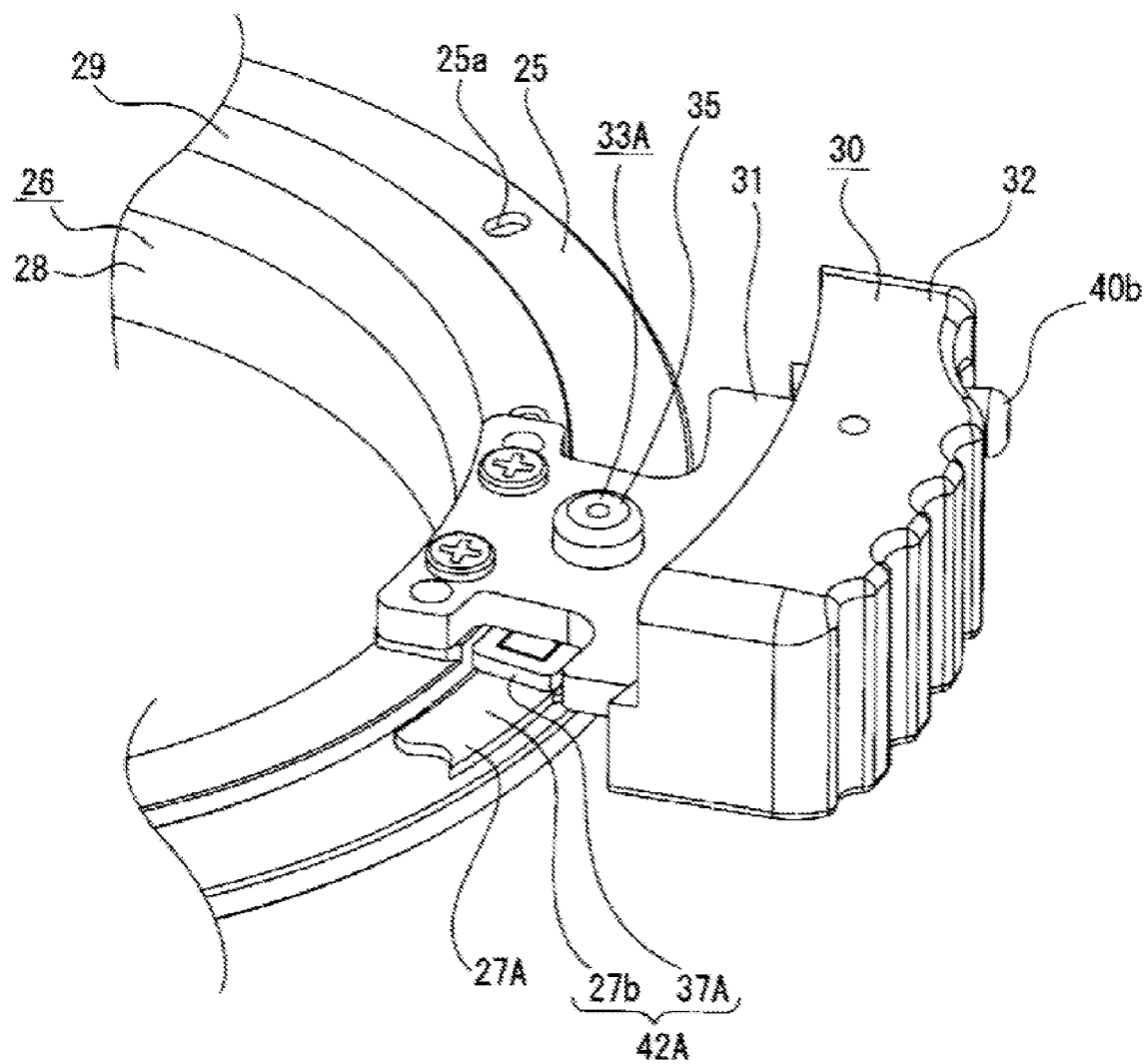
FIG. 17 is an enlarged perspective view illustrating a position of the operation section with respect to the detection switch when the lock lever is at the lock position.

If the lock lever 30 moves to a lock position, the operation section 37A is positioned to face the front side of the detection switch 27b (refer to FIG. 17). If the operation section 37A is positioned to face the front side of the detection switch 27b, the detection switch 27b is operated on the basis of a change in the magnetic field between the operation section 37A and the detection switch 27b and a detection operation to detect a connection state of the contact terminals 9a and the connection terminals 23a starts.

As such, if the non-contact-type detection switch 27b is used, the detection operation can be performed with the simple structure. Because the operation section 37A does not contact the detection switch 27b, the detection switch 27b can be prevented from being damaged.

When the non-contact-type detection switch 27b is used, the operation section 37A and the detection switch 27b function as a detection activation section 42A that starts the detection operation.

[Others]

In the above case, the configuration in which the detection switches 27a and 27b are fixed and the operation sections 37 and 37A move with the lock lever 30 has been described. In contrast, a configuration in which the operation sections 37 and 37A are fixed and the detection switches 27a and 27b move with the lock lever 30 may be used.

As such, if the configuration in which one of the detection switches 27a and 27b and the operation sections 37 and 37A is fixed and the other moves with the lock lever 30 is used, the detection operation can be securely started according to the operation of the lock lever 30, with the simple configuration.

In the above case, the example of the case in which the lock lever 30 is provided in the adapter 4 has been described. However, in contrast, the lock lever may be provided in the apparatus body 2.

[Embodiment of Imaging Apparatus]

Figure 18:
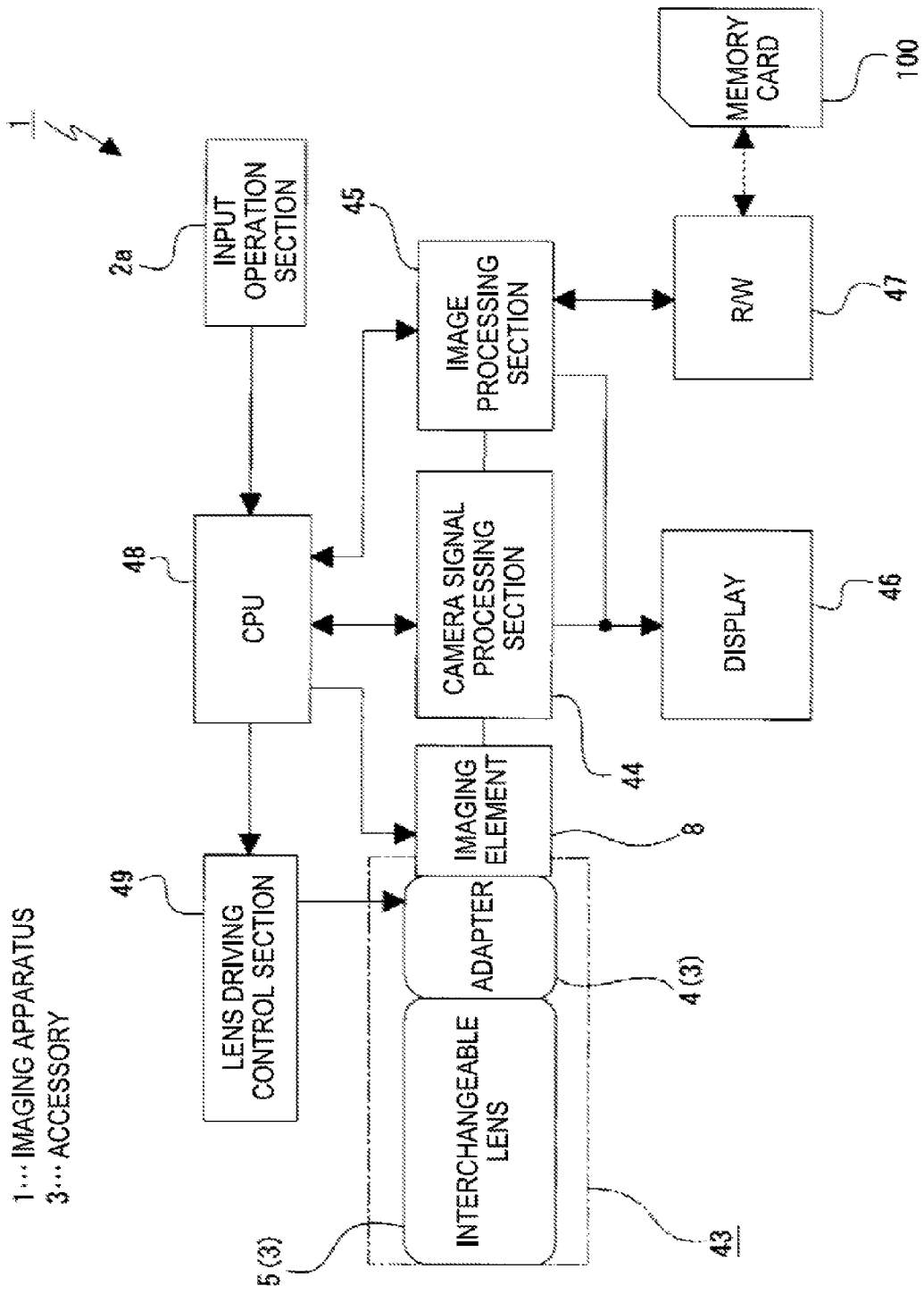
FIG. 18 is a block diagram of the imaging apparatus.

Hereinafter, a digital still camera of an imaging apparatus according to an embodiment of the present disclosure will be described with reference to FIG. 18. FIG. 18 is a block diagram of the imaging apparatus.

An imaging apparatus (digital still camera) 1 includes a camera block 43 that performs an imaging function, a camera signal processing section 44 that executes signal processing such as analog-to-digital conversion with respect to an imaged image signal, and an image processing section 45 that executes record/reproduction processing with respect to the image signal. The imaging apparatus 1 further includes a display 46 that displays an imaged image, a reader/writer (R/W) 47 that writes an image signal to a memory card 100 or reads the image signal from the memory card 100, a central processing unit (CPU) 48 that wholly controls the imaging apparatus 1, input operation sections 2a such as various switches in which necessary operations are performed by a user, and a lens driving control section 49 that controls driving of lenses arranged in the camera block 43.

The camera block 43 includes an interchangeable lens 5, an adapter 4, and an imaging element 8.

The camera signal processing section 44 executes a variety of signal processing such as converting a signal into a digital signal, noise removing, image quality correction, and converting a signal into a brightness/color-difference signal, with respect to an output signal from the imaging element 8.

The image processing section 45 executes compression encoding/extension decoding processing of an image signal based on a predetermined image data format or conversion processing of a data specification such as resolution.

The display 46 has a function of displaying an operation state of the user with respect to the input operation sections 2a or a variety of data such as the imaged image.

The R/W 47 writes image data encoded by the image processing section 45 to the memory card 100 or reads the image data recorded in the memory card 100.

The CPU 48 functions as a control processing section that controls individual circuit blocks provided in the imaging apparatus 1 and controls the individual circuit blocks on the basis of instruction input signals from the input operation sections 2a.

The input operation sections 2a are configured using a power supply button, a shutter button, a mode switching knob, and a zoom switch and output instruction input signals according to operations from the user to the CPU 48.

The lens driving control section 49 controls a motor driving each lens of the interchangeable lens 5 through the adapter 4, on the basis of a control signal from the CPU 48. The lens driving control section 49 may be arranged in the adapter 4.

The memory card 100 is a semiconductor memory to be inserted into or removed from a slot connected to the R/W 47.

Hereinafter, an operation of the imaging apparatus 1 will be described.

In an imaging standby state, under control from the CPU 48, an image signal that is imaged in the camera block 43 is output to the display 46 through the camera signal processing section 44 and is displayed as a camera-through image. If zooming instruction input signals are input from the input operation sections 2a, the CPU 48 outputs a control signal to the lens driving control section 49 and a predetermined lens of the interchangeable lens 5 moves according to the control from the lens driving control section 49.

If a shutter (not illustrated in the drawings) of the camera block 43 is operated by the instruction input signals from the input operation sections 2a, the imaged image signal is output from the camera signal processing section 44 to the image processing section 45, is subjected to compression encoding processing, and is converted into digital data with a predetermined data format. The converted data is output to the R/W 47 and is written to the memory card 100.

Zooming is performed by moving the predetermined lens of the interchangeable lens 5 by the lens driving control section 49 according to the control signal from the CPU 48, when the input operation section (zoom knob) 2a is operated.

Focusing is performed by moving the predetermined lens of the interchangeable lens 5 by the lens driving control section 49 according to the control signal from the CPU 4, when the input operation section (shutter button) 2a is half pressed or is completely pressed to perform recording (imaging).

When the image data recorded in the memory card 100 is reproduced, predetermined image data is read from the memory card 100 by the R/W 47, according to an operation with respect to the input operation sections 2a and is subjected to the extension decoding processing by the image processing section 45. Then, a reproduction image signal is output to the display 46 and a reproduction image is displayed.

[Summary]

As described above, the lock lever 30 that is operated between the lock position and the non-lock position and performs locking with respect to the apparatus body 2 when the lock lever is operated to the lock position is provided and the detection operation of the connection state of the plurality of contact terminals 9a and the plurality of connection terminals 23a starts when the lock lever 30 is operated to the lock position.

Therefore, because the detection operation is performed in a state in which the plurality of contact terminals 9a and the plurality of connection terminals 23a are connected to each other, an accurate detection operation with respect to the connection state of the contact terminals 9a and the connection terminals 23a can be secured.

By using the configuration in which the detection switches 27a and 27b are fixed and the operation sections 37 and 37A move with the lock lever 30, routing of wiring lines of the detection switches 27a and 27b can be easily performed.

Because the operation sections 37 and 37A are attached as parts of the spring cases 33 and 33A to the lock lever 30, a size can be decreased and a structure can be simplified by space saving.

In addition, because the operation sections 37 and 37A are provided in the spring cases 33 and 33A holding the biasing spring 38, the number of structural elements can be decreased and a structure can be simplified. Therefore, a manufacturing cost can be decreased.

[Present Technology]

Additionally, the present technology may also be configured as below.

(1) An accessory that is attachable to or detachable from an apparatus body having a plurality of contact terminals, the accessory including:

a plurality of connection terminals that are connected to the plurality of contact terminals, respectively, and exchange a signal with the apparatus body, when the plurality of connection terminals are attached to the apparatus body;

a lock lever that is operated between a lock position and a non-lock position and performs locking with respect to the apparatus body, when the lock lever is operated to the lock position; and a detection activation section that starts a detection operation of a connection state of the plurality of contact terminals and the plurality of connection terminals, when the lock lever is operated to the lock position.

(2) The accessory according to (1), wherein the detection activation section includes a detection switch and an operation section that operates the detection switch and causes the detection switch to operate, and one of the detection switch and the operation section is arranged in a fixed state and the other one of the detection switch and the operation section is moved with the lock lever.

(3) The accessory according to (2), wherein the detection switch is arranged in a fixed state, and the operation section is moved with the lock lever.

(4) The accessory according to (3), wherein the operation section is attached to the lock lever.

(5) The accessory according to any one of (2) to (4), wherein a contact-type switch that is operated by a contact of the operation section is used as the detection switch, and an external surface of a portion of the operation section that comes into contact with the detection switch is formed in a shape of an outward convex curved surface.

(6) The accessory according to any one of (2) to (4), wherein a non-contact-type switch that is operated based a change in a magnetic field is used as the detection switch.

(7) The accessory according to any one of (1) to (6), wherein a click ball that is moved according to movement of the lock lever, a fixing section that has a rolling surface on which the click ball is rolled and is provided with a fitting recess into which the click ball is fitted, and a biasing spring that pushes the click ball to the rolling surface are provided, and the click ball is fitted into the fitting recess, when the lock lever is moved to the lock position.

(8) The accessory according to (7), wherein a spring case that holds the biasing spring is provided, and the operation section is provided in the spring case.

(9) An imaging apparatus including:
an apparatus body that has a plurality of contact terminals; and
an accessory that is attachable to or detachable from the apparatus body and has a plurality of connection terminals which are connected to the plurality of contact terminals, respectively, and exchange a signal with the apparatus body, when the plurality of connection terminals are attached to the apparatus body,
wherein a lock lever that is operated between a lock position and a non-lock position and locks the accessory to the apparatus body when the lock lever is operated to the lock position and a detection activation section that starts a detection operation of a connection state of the plurality of contact terminals and the plurality of connection terminals, when the lock lever is operated to the lock position, are provided.

(10) A detection method including:
attaching an accessory having a plurality of connection terminals to an apparatus body having a plurality of contact terminals and connecting the plurality of contact terminals to the plurality of connection terminals, respectively; and
starting a detection operation of a connection state of the plurality of contact terminals and the plurality of connection terminals, when a lock lever operated between a lock position and a non-lock position is operated to the lock position and the accessory is locked to the apparatus body.

It should be understood by those skilled in the art that various modifications, combinations, sub-combinations and alterations may occur depending on design requirements and other factors insofar as they are within the scope of the appended claims or the equivalents thereof.

What is claimed is:

1. An accessory that is attachable to or detachable from an apparatus body having a plurality of contact terminals, the accessory comprising:
a plurality of connection terminals configured to be connected to the plurality of contact terminals and configured to exchange a signal with the apparatus body, when the accessory is attached to the apparatus body;
a lock lever that is operated between a lock position and a non-lock position and performs locking with respect to the apparatus body, when the lock lever is operated to the lock position;
a detection activation section that detects a connection state of the plurality of contact terminals and the plurality of connection terminals, when the lock lever is operated to the lock position; and
a fixing ring that has a rolling surface on which a click ball, which is coupled to the lock lever, is rolled in accordance with the movement of the lock lever, wherein the click ball is fitted into a first fitting recess on the fixing ring when the lock lever is operated to the non-lock position.

2. The accessory according to claim 1, wherein
the detection activation section comprises a detection switch and an operation section that operates the detection switch, and
one of the detection switch and the operation section is arranged in a fixed state and other one of the detection switch and the operation section is moved with the lock lever.

3. The accessory according to claim 2, wherein
the detection switch is arranged in the fixed state, and
the operation section is moved with the lock lever.

4. The accessory according to claim 3, wherein
the operation section is attached to the lock lever.

5. The accessory according to claim 2, wherein
a contact-type switch that is operated by a contact of the operation section is used as the detection switch, and
an external surface of a portion of the operation section that comes into contact with the detection switch is formed in a shape of an outward convex curved surface.

6. The accessory according to claim 2, wherein
a non-contact-type switch that is operated based on a change in a magnetic field is used as the detection switch.

7. The accessory according to claim 1, further comprising
a movable ring, coupled to the lock lever, rotatable about the fixing ring in accordance with the movement of the lock lever; and
a biasing spring, coupled to the lock lever, which pushes the click ball to the rolling surface of the fixing ring, wherein the biasing spring pushes the click ball to be fitted into the first fitting recess when the lock lever is operated to the non-lock position and pushes the click ball to be fitted into a second fitting recess on the fixing ring when the lock lever is operated to the lock position.

8. The accessory according to claim 1, wherein
the detection activation section comprises a detection switch and an operation section that operates the detection switch, wherein
the lock lever is coupled to a spring case that holds a biasing spring, and wherein
the operation section is coupled to the spring case.

9. The accessory according to claim 1, further comprising:
an attached section of which a forward-to-backward direction is an axial direction and is formed in cylindrical shape;
a coupling ring attached to a front surface of the attached section and is formed in a shape of a thin ring oriented in the forward-to-backward direction;
a connection section, arranged at a lower end of the attached section, that protrudes backward from the attached section, wherein the connection section comprises the plurality of connection terminals; and
a removable section provided on a rear surface of the attached section.

10. The accessory according to claim 9, wherein the removable section comprises the fixing ring and a movable ring which is rotatable about the fixing ring in accordance with the movement of the lock lever.

11. The accessory according to claim 10, wherein the movable ring is coupled to the lock lever.

12. The accessory according to claim 1, further comprising
a wiring plate, attached to a front surface of the fixing ring, that functions as a detection switch of the detection activation section.

13. The accessory according to claim 1, wherein the lock lever has a connection arm and an operation section attached to one end of the connection arm, wherein the operation section is a part of the detection activation section.

14. The accessory according to claim 13, wherein the connection arm comprises an arrangement hole in which a spring case is inserted.

15. The accessory according to claim 14, wherein the spring case comprises:
a base section;
an arm section that protrudes laterally from an outer circumferential surface of the base section; and
the operation section that protrudes backward from an end of the arm section.

16. The accessory according to claim 14, wherein the spring case comprises a spring support hole and a biasing spring that is a compression coil spring arranged in the spring support hole.

17. The accessory according to claim 16, wherein the spring case comprises the click ball supported to a rear end of the biasing spring and wherein the biasing spring pushes the click ball to the rolling surface and into the first fitting recess and the second fitting recess of the fixing ring in accordance with the movement of the lock lever.

18. The accessory according to claim 1, further comprising a spring case that comprises the click ball and a biasing spring, wherein the click ball is supported to a rear end of the biasing spring and wherein the biasing spring pushes the click ball to the rolling surface and into the first fitting recess and the second fitting recess of the fixing ring in accordance with the movement of the lock lever.

19. An imaging apparatus comprising:
an apparatus body that has a plurality of contact terminals; and
an accessory that is attachable to or detachable from the apparatus body and has a plurality of connection terminals configured to be connected to the plurality of contact terminals and configured to exchange a signal with the apparatus body, when the accessory is attached to the apparatus body, wherein the accessory comprises:
a lock lever that is operated between a lock position and a non-lock position and locks the accessory to the apparatus body when the lock lever is operated to the lock position
a detection activation section that detects a connection state of the plurality of contact terminals and the plurality of connection terminals, when the lock lever is operated to the lock position, and
a fixing ring that has a rolling surface on which a click ball, which is coupled to the lock lever, is rolled in accordance with the movement of the lock lever, wherein the click ball is fitted into a fitting recess on the fixing ring when the lock lever is operated to the non-lock position.

20. A detection method comprising:
detecting a connection state of a plurality of contact terminals of an apparatus body and a plurality of connection terminals of an accessory when a lock lever, operable between a lock position and a non-lock position, is operated to the lock position and the accessory is locked to the apparatus body,
wherein a fixing ring in the accessory has a rolling surface on which a click ball, which is coupled to the lock lever, is rolled in accordance with the movement of the lock lever, and
wherein the click ball is fitted into a fitting recess on the fixing ring when the lock lever is operated to the non-lock position.

* * * * *